US010103382B2

(12) United States Patent
Goto et al.

(10) Patent No.: US 10,103,382 B2
(45) Date of Patent: Oct. 16, 2018

(54) NONAQUEOUS ELECTROLYTE SECONDARY BATTERY

(71) Applicant: Panasonic Intellectual Property Management Co., Ltd., Osaka (JP)

(72) Inventors: Natsumi Goto, Hyogo (JP); Takashi Takeuchi, Osaka (JP); Masaki Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 72 days.

(21) Appl. No.: 15/342,899

(22) Filed: Nov. 3, 2016

(65) Prior Publication Data

US 2017/0054150 A1    Feb. 23, 2017

Related U.S. Application Data

(62) Division of application No. 14/522,575, filed on Oct. 23, 2014, which is a division of application No. (Continued)

(51) Int. Cl.
*H01M 4/485* (2010.01)
*H01M 4/525* (2010.01)
(Continued)

(52) U.S. Cl.
CPC ........... *H01M 4/485* (2013.01); *H01M 4/131* (2013.01); *H01M 4/505* (2013.01); *H01M 4/525* (2013.01);
(Continued)

(58) Field of Classification Search
CPC ...... H01M 4/485; H01M 4/505; H01M 4/131; H01M 10/0525; H01M 4/525;
(Continued)

(56) References Cited

U.S. PATENT DOCUMENTS 6,022,640 A    2/2000   Takada et al.
6,165,646 A    12/2000  Takada et al.
(Continued)

FOREIGN PATENT DOCUMENTS

CN    101373829 A    2/2009
EP       1653534 A1   3/2006
(Continued)

OTHER PUBLICATIONS

Chinese Office Action and Search Report issued in Chinese Patent Application No. 201280018739.4 dated Mar. 31, 2015 (with English translation of Search Report).
(Continued)

*Primary Examiner* — Cynthia K Walls
(74) *Attorney, Agent, or Firm* — McDermott Will & Emery LLP

(57) ABSTRACT

A nonaqueous electrolyte secondary battery disclosed in the present application includes: a positive electrode capable of absorbing and releasing lithium, containing a positive electrode active material composed of a lithium-containing transition metal oxide having a layered crystalline structure; and a negative electrode capable of absorbing and releasing lithium, containing a negative electrode active material composed of a lithium-containing transition metal oxide obtained by substituting some of Ti element of a lithium-containing titanium oxide having a spinel crystalline structure with one or more element different from Ti, wherein a retention of the negative electrode is set to be greater than a retention of the positive electrode, and an irreversible capacity rate of the negative electrode is set to be greater than an irreversible capacity rate of the positive electrode, whereby a discharge ends by negative electrode limitation.

8 Claims, 19 Drawing Sheets

Related U.S. Application Data

13/450,155, filed on Apr. 18, 2012, now Pat. No. 8,920,976.

(60) Provisional application No. 61/477,501, filed on Apr. 20, 2011.

(51) Int. Cl.
  *H01M 10/0525*  (2010.01)
  *H01M 4/131*  (2010.01)
  *H01M 4/505*  (2010.01)
  *H01M 10/42*  (2006.01)
  *H01M 4/02*  (2006.01)

(52) U.S. Cl.
  CPC .. *H01M 10/0525* (2013.01); *H01M 2004/027* (2013.01); *H01M 2010/4292* (2013.01); *Y02T 10/7011* (2013.01)

(58) Field of Classification Search
  CPC .... H01M 2004/027; H01M 2010/4292; Y02T 10/7011
  See application file for complete search history.

(56) References Cited

U.S. PATENT DOCUMENTS

| | | | |
|---|---|---|---|
| 6,352,796 B1 | 3/2002 | Takada et al. | |
| 6,458,487 B1 | 10/2002 | Takeuchi et al. | |
| 2003/0054251 A1 | 3/2003 | Ohzuku et al. | |
| 2006/0093920 A1 | 5/2006 | Cheon et al. | |
| 2008/0076030 A1 | 3/2008 | Inagaki et al. | |
| 2008/0113264 A1* | 5/2008 | Inagaki | H01M 4/485 429/156 |
| 2009/0035662 A1 | 2/2009 | Scott et al. | |
| 2011/0262811 A1* | 10/2011 | Kinoshita | H01M 4/131 429/217 |
| 2012/0045696 A1 | 2/2012 | Herle | |

FOREIGN PATENT DOCUMENTS

| | | | |
|---|---|---|---|
| JP | 7-335261 | A | 12/1995 |
| JP | 10-144351 | A | 5/1998 |
| JP | 2001-126728 | A | 5/2001 |
| JP | 2001-143702 | A | 5/2001 |
| JP | 2001-196061 | A | 7/2001 |
| JP | 2003-297433 | A | 10/2003 |
| JP | 2004-235144 | A | 8/2004 |
| JP | 2005-135775 | A | 5/2005 |
| JP | 2006-128119 | A | 5/2006 |
| JP | 2006-216305 | A | 8/2006 |
| JP | 2007-305447 | A | 11/2007 |
| JP | 2008-060076 | A | 3/2008 |

OTHER PUBLICATIONS

International Search Report issued in International Patent Application No. PCT/JP2012/002664 dated Jul. 24, 2012.

P. Kubiak, et al., "Phase transition in the spinel Li4Ti5O12 induced by lithium insertion influence of the substitutions Ti/V, TiMn, Ti/Fe," Journal of Power Sources, vol. 119-121, pp. 626-630, 2003.

Form PCT/ISA/237 and partial English translation, issued in International Patent Application No. PCT/JP2012/002664 dated Jul. 24, 2012.

U.S. Office Action issued in U.S. Appl. No. 13/371,032 dated May 20, 2014.

U.S. Office Action issued in U.S. Appl. No. 13/450,155 dated Nov. 13, 2013.

U.S. Office Action issued in U.S. Appl. No. 13/450,155 dated Apr. 7, 2014.

U.S. Notice of Allowance issued in U.S. Appl. No. 13/450,155 dated Jul. 24, 2013.

Machine translation of Hiroshi, et al. (JP-2003-297433, published Oct. 2003, pp. 1-9).

European Communication dated Sep. 25, 2015 issued in European Patent Application No. 12 774 775.6.

U.S. Office Action dated Aug. 4, 2016 issued in U.S. Appl. No. 14/522,575.

Chinese Office Action and Search Report issued in Chinese Patent Application No. 2015032601160010 dated Mar. 31, 2015 (with English translation of Search Report).

* cited by examiner

NONAQUEOUS ELECTROLYTE SECONDARY BATTERY

CROSS-REFERENCE TO RELATED APPLICATION

This application is a Divisional of U.S. patent application Ser. No. 14/522,575, filed on Oct. 23, 2014, which is a Divisional of U.S. patent application Ser. No. 13/450,155, filed on Apr. 18, 2012, now U.S. Pat. No. 8,920,976, which claims priority to U.S. Provisional Patent Application No. 61/477,501, filed on Apr. 20, 2011, the disclosures of which are incorporated herein in their entirety by reference.

BACKGROUND

1. Technical Field

The present application relates to a nonaqueous electrolyte secondary battery, particularly a lithium ion secondary battery, including a negative electrode active material containing a lithium-containing titanium oxide and a positive electrode active material having a layered structure.

2. Description of the Related Art

In recent years, various types of nonaqueous electrolyte secondary batteries have been developed. Typical nonaqueous electrolyte secondary batteries include lithium ion secondary batteries. While carbon materials have been mainly used conventionally as negative electrode active materials of lithium ion secondary batteries, lithium titanium composite oxide materials have been newly developed and drawing public attention. For example, a lithium ion secondary battery using $Li_4Ti_5O_{12}$ as the negative electrode active material has already been commercialized.

$Li_4Ti_5O_{12}$ can be used as an active material of a lithium ion secondary battery since it is a material having a spinel-type crystalline structure and is capable of repeatedly absorbing and releasing Li. $Li_4Ti_5O_{12}$ absorbs and releases Li at a potential of about 1.5 V with respect to the standard redox potential ($Li/Li^+$) of lithium. Therefore, where $Li_4Ti_5O_{12}$ is used as the negative electrode active material in a lithium ion secondary battery, it is believed that a lithium ion secondary battery with a high level of safety is realized in which a lithium metal is unlikely to deposit on the negative electrode even if a reaction over-voltage occurs due to rapid charging, or the like. It is also characterized in that there is very little lattice expansion caused by charging and discharging.

On the other hand, an oxide material having a layered or spinel-type crystalline structure is commonly used as the positive electrode active material of a lithium ion secondary battery. Particularly, an oxide material having a layered crystalline structure has been drawing public attention as it is capable of realizing a high capacity. Typical examples include $LiCoO_2$, $LiNi_{0.81}Co_{0.15}Al_{0.04}O_2$, $LiNi_{1/3}Mn_{1/3}Co_{1/3}O_2$, etc.

Therefore, lithium ion batteries have been developed in which a composite oxide having a layered structure and $Li_4Ti_5O_{12}$ are used as the positive electrode active material and the negative electrode active material, respectively. For example, Japanese Laid-Open Patent Publication No. 2001-143702 proposes a lithium ion secondary battery in which a lithium titanate compound represented by general formula $Li_aTi_{3-a}O_4$ (where "a" denotes a number satisfying 0<a<3) is used for the negative electrode, and a compound represented by general formula $LiCo_bNi_{1-b}O_2$ (0≤b≤1), or $LiAl_cCo_dNi_{a-c-d}O_2$ (0≤c≤1, 0≤d≤1, 0≤c+d≤1), is used for the positive electrode.

In a conventional nonaqueous electrolyte secondary battery including a positive electrode and a negative electrode as described above, the irreversible capacity rate (retention) of the negative electrode in the initial charge and discharge is smaller than that of the positive electrode. Therefore, as the potential of the positive electrode decreases before the potential of the negative electrode increases during a discharge, thus reaching the cut-off voltage (end voltage) of the battery. The battery voltage reaching the cut-off voltage due to a decrease in the positive electrode potential is called positive electrode limitation. Conversely, the battery voltage reaching the cut-off voltage due to an increase in the negative electrode potential before the potential of the positive electrode decreases is called negative electrode limitation.

SUMMARY

However, with the above conventional nonaqueous electrolyte secondary battery, since the potential of the positive electrode decreases during a discharge, deterioration of the positive electrode active material proceeds, thus deteriorating the cycle characteristics.

A non-limiting example embodiment of the present application provides a nonaqueous electrolyte secondary battery with excellent cycle characteristics.

A nonaqueous electrolyte secondary battery disclosed in the present application includes: a positive electrode capable of absorbing and releasing lithium, containing a positive electrode active material composed of a lithium-containing transition metal oxide having a layered crystalline structure; and a negative electrode capable of absorbing and releasing lithium, containing a negative electrode active material composed of a lithium-containing transition metal oxide obtained by substituting some of Ti element of a lithium-containing titanium oxide having a spinel crystalline structure with one or more element different from Ti, wherein a discharge ends by negative electrode limitation.

With a nonaqueous electrolyte secondary battery according to one embodiment of the present invention, the negative electrode active material is composed of a compound obtained by substituting some of Ti element of a lithium-containing titanium oxide with one or more element different from Ti, whereby an irreversible capacity rate greater than that of a lithium-containing titanium oxide can be realized. Thus, employing the negative electrode limitation, it is possible to realize a nonaqueous electrolyte secondary battery with excellent cycle characteristics.

DETAILED DESCRIPTION

Figure 1A:
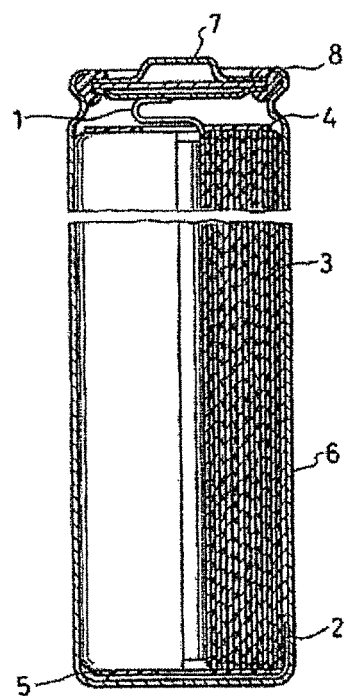
FIG. 1A shows a cross-sectional view showing an embodiment of a nonaqueous electrolyte secondary battery according to the present invention.

The outline of one embodiment of the present invention is as follows.

A nonaqueous electrolyte secondary battery according to one embodiment of the present invention includes: a positive electrode capable of absorbing and releasing lithium, containing a positive electrode active material composed of a lithium-containing transition metal oxide having a layered crystalline structure; and a negative electrode capable of absorbing and releasing lithium, containing a negative electrode active material composed of a lithium-containing transition metal oxide obtained by substituting some of Ti element of a lithium-containing titanium oxide having a spinel crystalline structure with one or more element different from Ti, wherein a discharge ends by negative electrode limitation.

The negative electrode active material has an irreversible capacity rate greater than the positive electrode active material.

The lithium-containing titanium oxide is $Li_4Ti_5O_{12}$.

The lithium-containing transition metal oxide obtained by substituting some of Ti element of a lithium-containing titanium oxide having a spinel crystalline structure with one or more element different from Ti includes a compound represented as $Li_4Ti_{5-w}Mn_wO_{12}$ ($0<w\leq0.3$).

The lithium-containing transition metal oxide obtained by substituting some of Ti element of a lithium-containing titanium oxide having a spinel crystalline structure with one or more element different from Ti includes a compound represented as $Li_4Ti_{5-x}Fe_xO_{12}$ ($0<x\leq0.3$).

The lithium-containing transition metal oxide obtained by substituting some of Ti element of a lithium-containing titanium oxide having a spinel crystalline structure with one or more element different from Ti includes a compound represented as $Li_4Ti_{5-y}V_yO_{12}$ ($0<y\leq0.05$).

The lithium-containing transition metal oxide obtained by substituting some of Ti element of a lithium-containing titanium oxide having a spinel crystalline structure with one or more element different from Ti includes a compound represented as $Li_4Ti_{5-z}B_zO_{12}$ ($0<z\leq0.3$).

The lithium-containing transition metal oxide obtained by substituting some of Ti element of a lithium-containing titanium oxide having a spinel crystalline structure with one or more element different from Ti includes a compound represented as $Li_4Ti_{5-w-y}Mn_wV_yO_{12}$ ($0<w\leq0.3$, $0<y\leq0.05$).

The lithium-containing transition metal oxide obtained by substituting some of Ti element of a lithium-containing titanium oxide having a spinel crystalline structure with one or more element different from Ti includes a compound represented as $Li_4Ti_{5-w-z}Mn_wB_zO_{12}$ ($0<w\leq0.3$, $0<z\leq0.3$).

The lithium-containing transition metal oxide obtained by substituting some of Ti element of a lithium-containing titanium oxide having a spinel crystalline structure with one or more element different from Ti includes a compound represented as $Li_4Ti_{5-x-y}Fe_xV_yO_{12}$ ($0<x\leq0.3$, $0<y\leq0.05$).

The lithium-containing transition metal oxide obtained by substituting some of Ti element of a lithium-containing titanium oxide having a spinel crystalline structure with one or more element different from Ti includes a compound represented as $Li_4Ti_{5-x-z}Fe_xB_zO_{12}$ ($0<x\leq0.3$, $0<z\leq0.3$).

The positive electrode active material includes at least one compound represented as $Li_aNi_{1-b-c}Co_bM_cO_2$ ($0.95\leq a\leq1.12$, $0 \leq b \leq 1$, $0 \leq c \leq 0.50$, $0 \leq b+c \leq 1$, M is at least one element selected from the group consisting of Al, Mn, Ti, Mg, Mo, Y, Zr and Ca).

The positive electrode active material includes at least one selected from the group consisting of: a compound represented as $LiCoO_2$; a compound represented as $LiNi_{1/3}Mn_{1/3}Co_{1/3}O_2$; and a compound represented as $LiNi_{0.81}Co_{0.15}Al_{0.04}O_2$.

An embodiment of a nonaqueous electrolyte secondary battery according to the present invention will now be described with reference to the drawings.

FIG. 1A schematically shows a cross section of a cylindrical nonaqueous electrolyte secondary battery, which is one embodiment of the nonaqueous electrolyte secondary battery according to the present invention. The nonaqueous electrolyte secondary battery of the present invention can be embodied in any of various shapes such as a rectangular battery or a stack battery, in addition to the cylindrical shape.

Figure 1B:
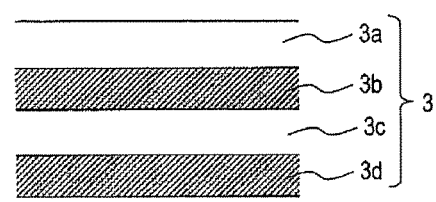
FIG. 1B shows a cross-sectional view schematically showing a structure of a group of electrodes of the nonaqueous electrolyte secondary battery shown in FIG. 1A.

The nonaqueous electrolyte secondary battery shown in FIG. 1A includes a group of electrodes 3 rolled up in a spiral shape. As shown in FIG. 1B, the group of electrodes 3 include a negative electrode 3a, a positive electrode 3c, and a separator 3b arranged between the negative electrode 3a and the positive electrode 3c. In the present embodiment, a separator 3d is further included which is arranged on one surface of the positive electrode 3c that is opposite to the surface on which the separator 3b is provided so that the negative electrode 3a and the positive electrode 3c will not contact each other as the group of electrodes 3 is rolled up. For embodiments other than the cylindrical embodiment, the separator 3d may be absent.

The negative electrode 3a and the positive electrode 3c include a negative electrode active material and a positive electrode active material, respectively, capable of absorbing and releasing lithium. The separators 3b and 3d are arranged between the positive electrode 3c and the negative electrode 3a, providing insulation between these electrodes and holding these electrodes with a predetermined gap therebetween.

The group of electrodes 3 is accommodated in a battery case 6. A positive electrode lead 1 is extended from the positive electrode 3c to be connected to a sealing plate 7, and a negative electrode lead 2 is extended from the negative electrode 3a to be connected to the bottom portion of the battery case 6. Metals and alloys that are anti-organic-electrolyte and electron-conductive may be used for the battery case 6, the positive electrode lead 1, and the negative electrode lead 2. For example, a metal such as iron, nickel, titanium, chromium, molybdenum, copper, aluminum, and the like, and an alloy thereof may be used. For example, a stainless steel or an Al—Mn alloy plate may be machined to be used as the battery case 6. Aluminum may be used for the positive electrode lead 1. Nickel or aluminum may be used for the negative electrode lead 2. The battery case 6 may be a combination of any of various engineering plastics and a metal in order to reduce the weight. Insulation plates 4 and 5 are provided on the upper portion and the lower portion, respectively, of the group of electrodes 3.

As will be described in detail below, in the nonaqueous electrolyte secondary battery of the present embodiment, the positive electrode active material is composed of a lithium-containing transition metal oxide having a layered crystalline structure. The negative electrode active material is composed of a lithium-containing transition metal oxide in which some of Ti element of the lithium-containing titanium oxide having a spinel crystalline structure is substituted with one or more element different from Ti.

Figure 1C:
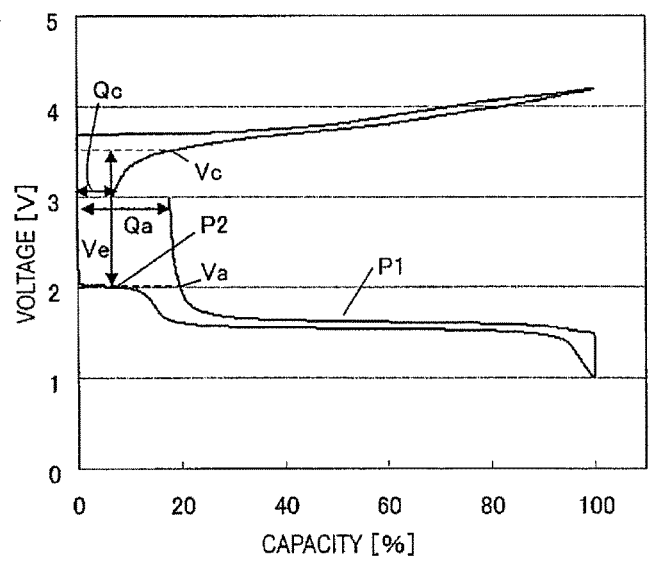
FIG. 1C shows a charge-discharge curve for the positive electrode and the negative electrode of the nonaqueous electrolyte secondary battery according to the present invention.
Figure 2:
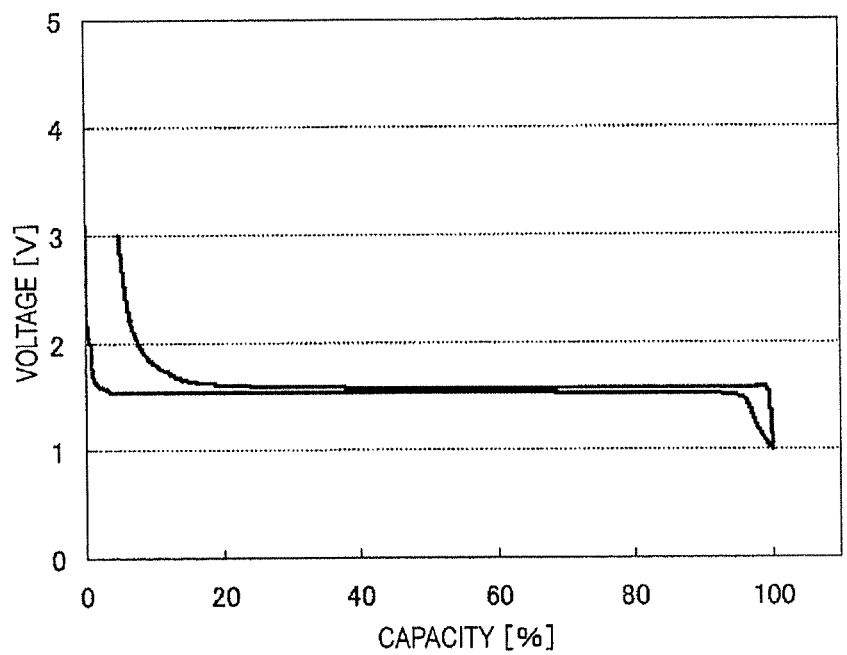
FIG. 2 shows a charge-discharge curve for metal Li of a negative electrode active material of Example 1.
Figure 3:
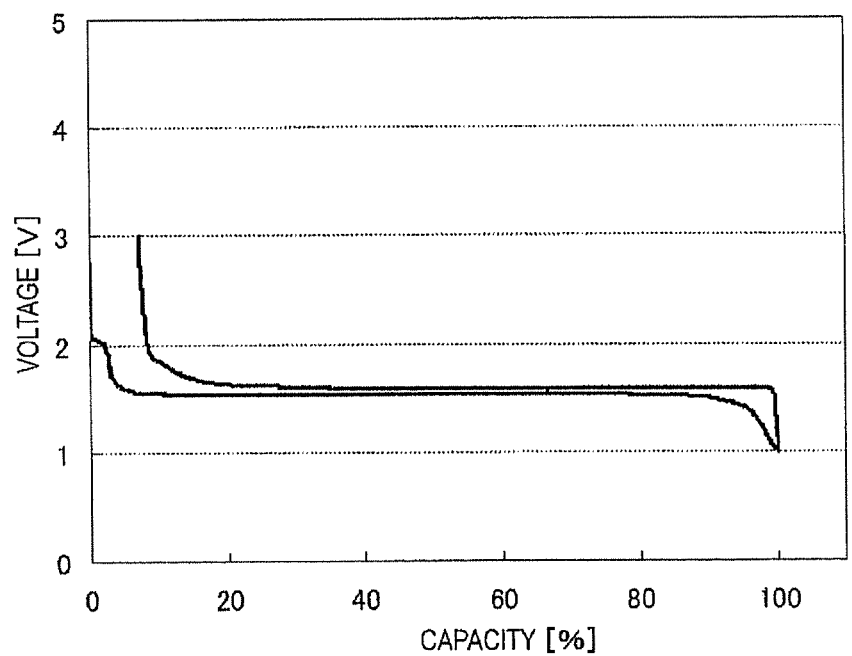
FIG. 3 shows a charge-discharge curve for metal Li of a negative electrode active material of Example 2.
Figure 4:
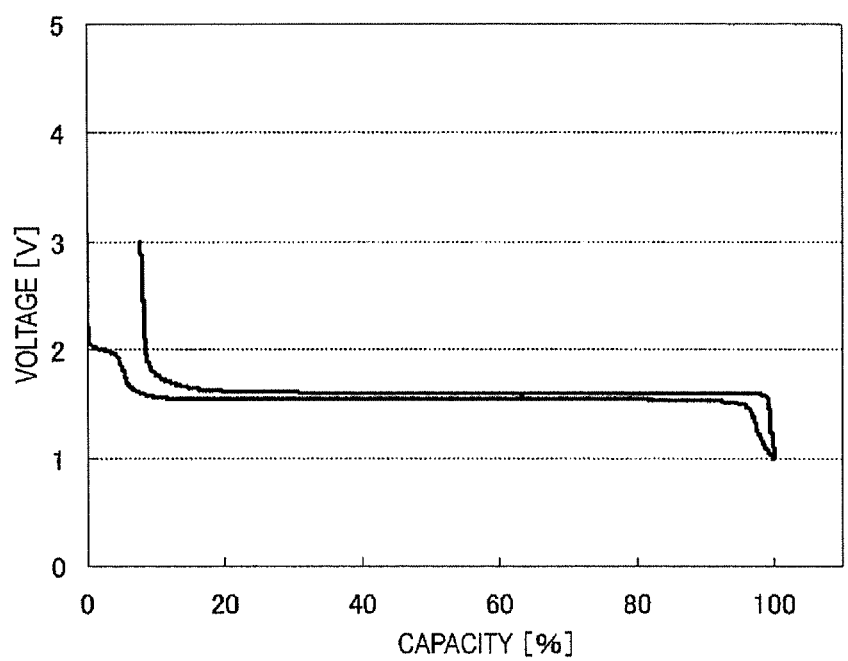
FIG. 4 shows a charge-discharge curve for metal Li of a negative electrode active material of Example 3.
Figure 5:
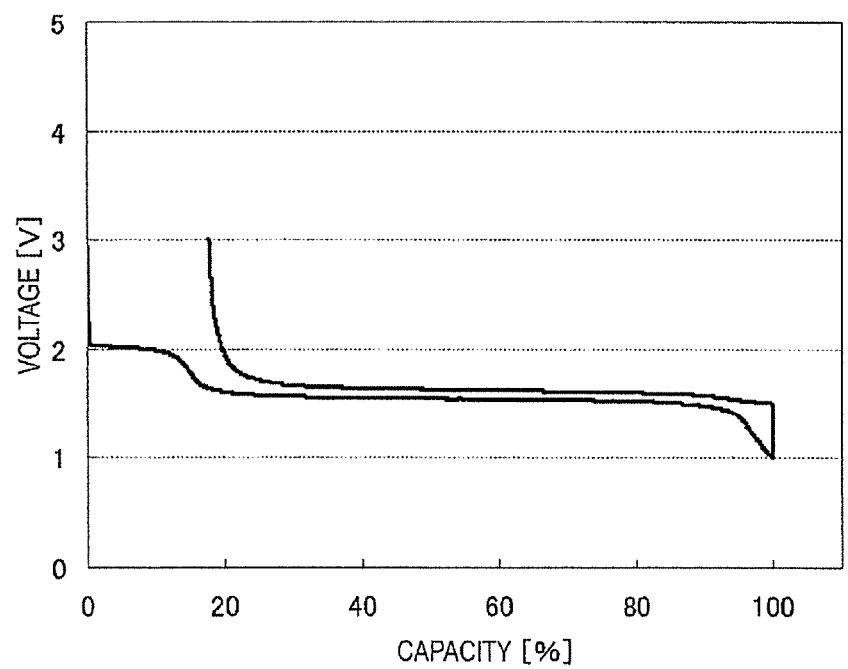
FIG. 5 shows a charge-discharge curve for metal Li of a negative electrode active material of Example 4.
Figure 6:
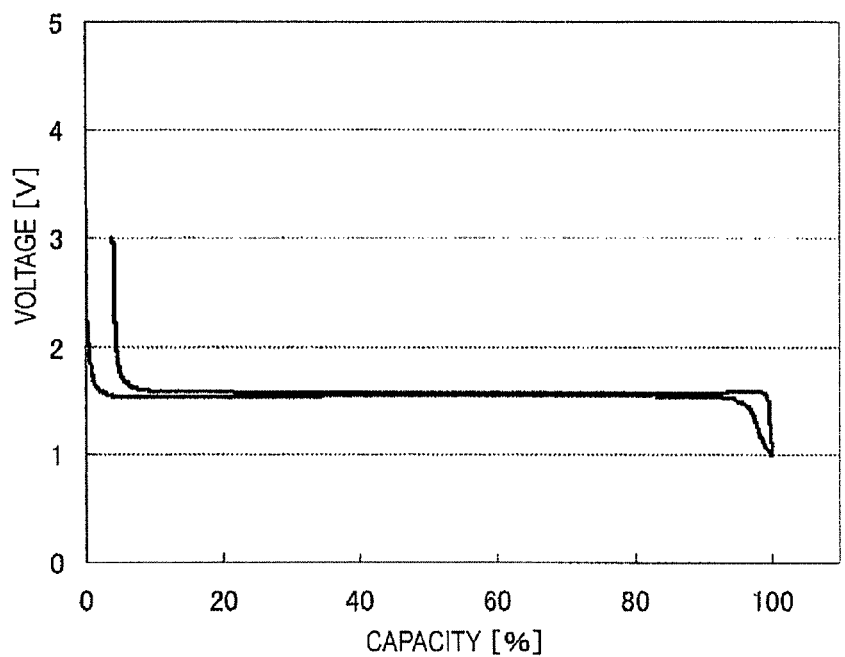
FIG. 6 shows a charge-discharge curve for metal Li of a negative electrode active material of Example 5.
Figure 7:
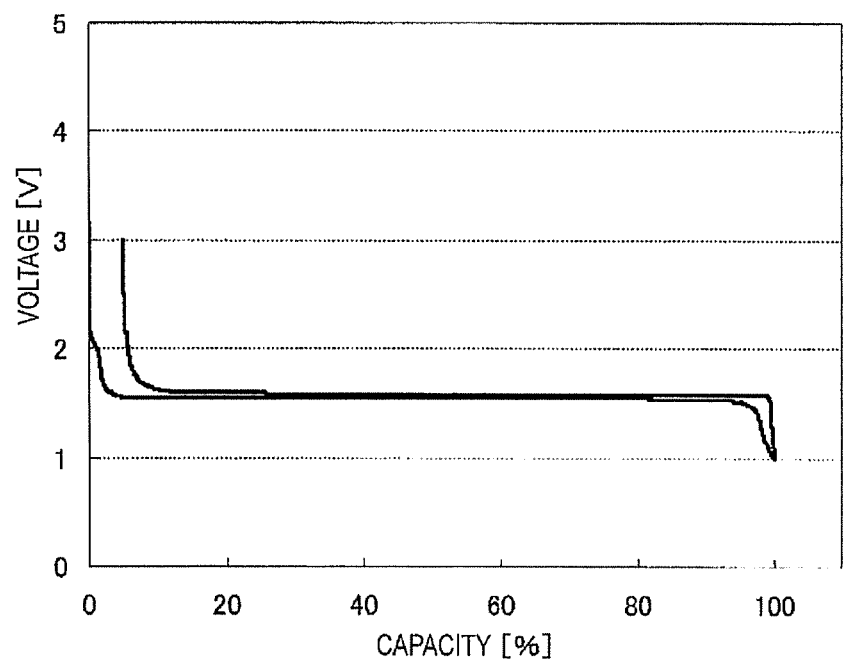
FIG. 7 shows a charge-discharge curve for metal Li of a negative electrode active material of Example 6.
Figure 8:
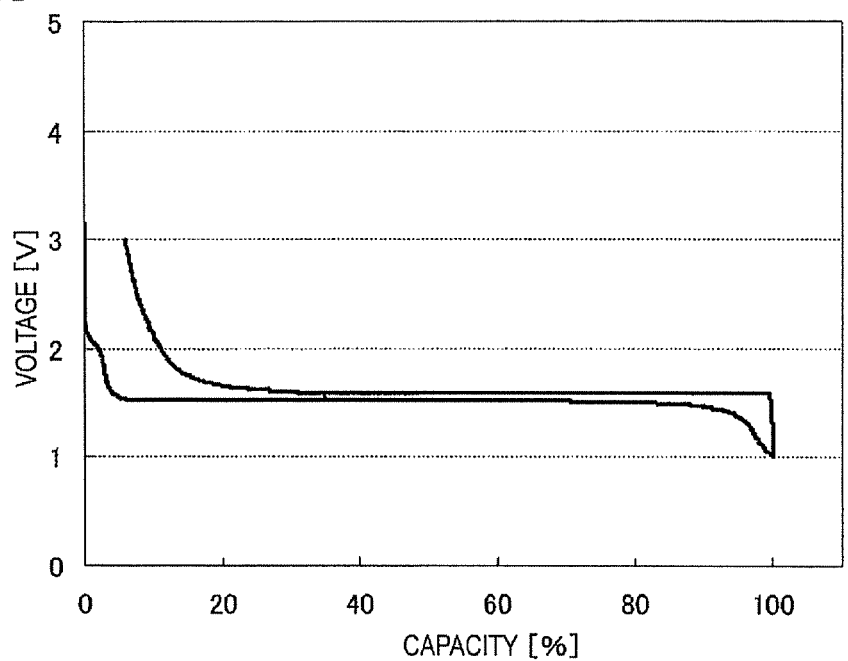
FIG. 8 shows a charge-discharge curve for metal Li of a negative electrode active material of Example 7.
Figure 9:
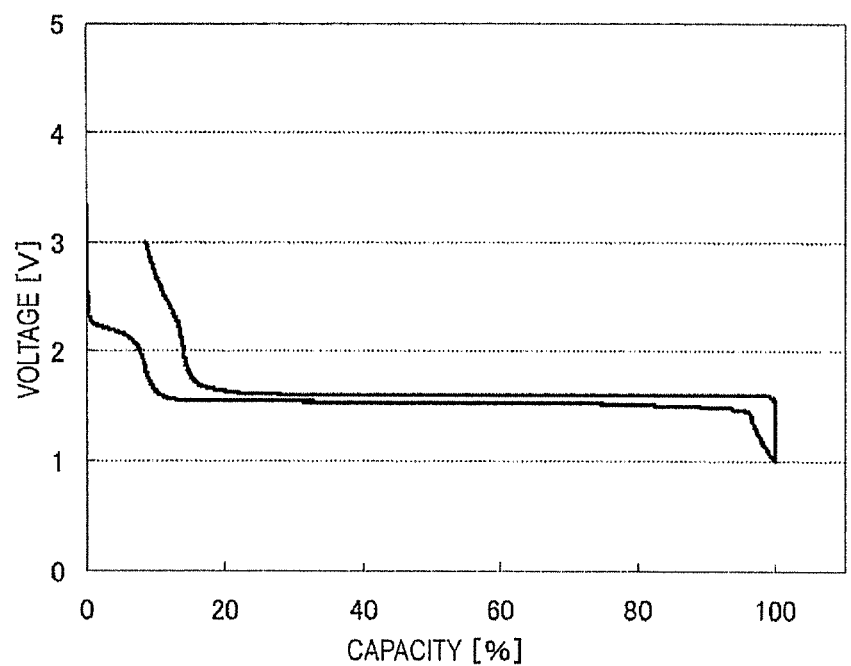
FIG. 9 shows a charge-discharge curve for metal Li of a negative electrode active material of Example 8.
Figure 10:
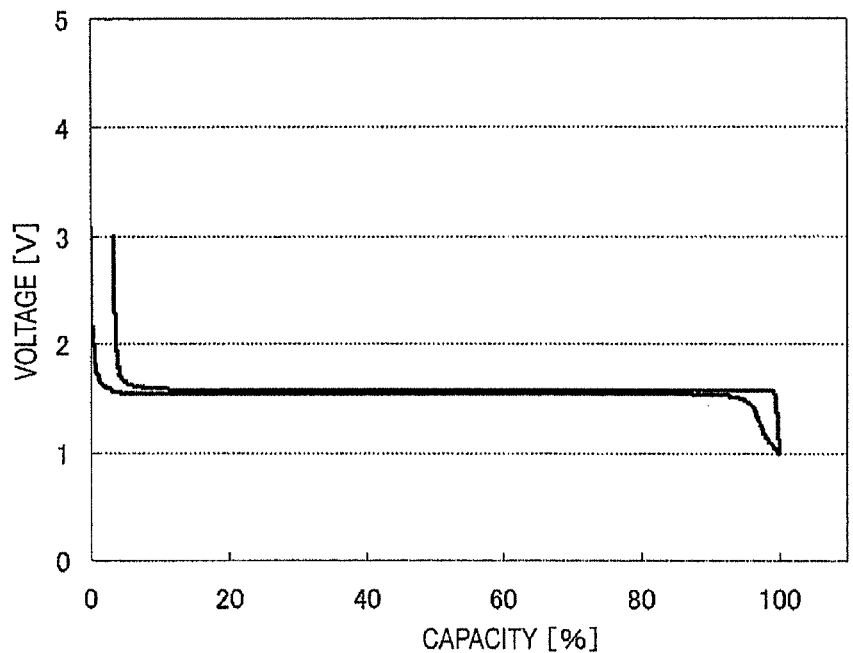
FIG. 10 shows a charge-discharge curve for metal Li of a negative electrode active material of Example 9.
Figure 11:
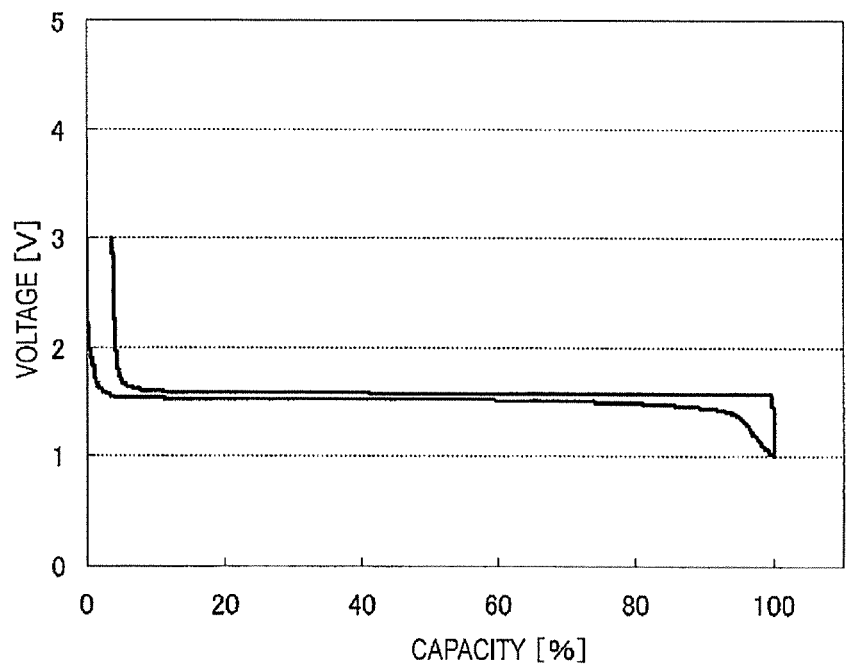
FIG. 11 shows a charge-discharge curve for metal Li of a negative electrode active material of Example 10.
Figure 12:
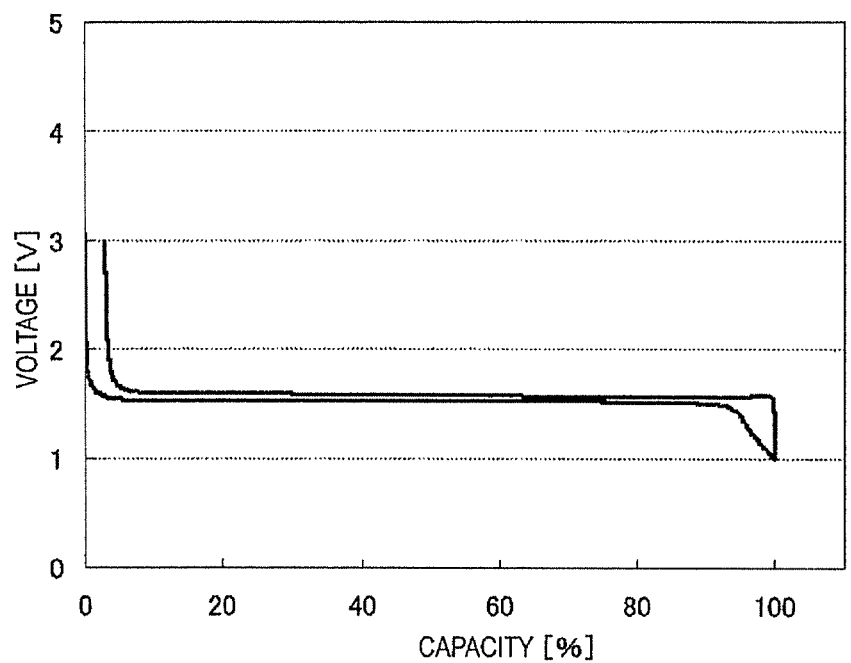
FIG. 12 shows a charge-discharge curve for metal Li of a negative electrode active material of Example 11.
Figure 13:
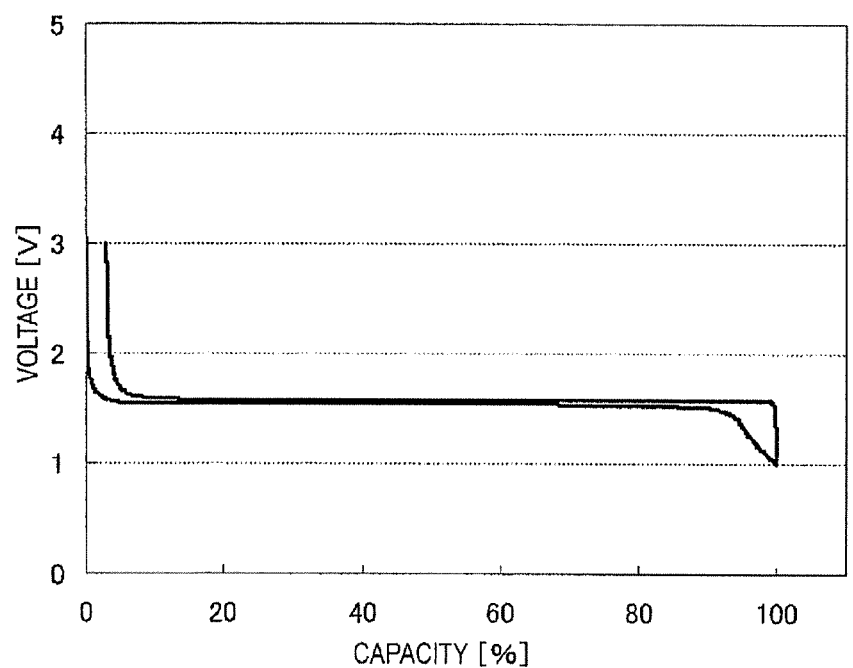
FIG. 13 shows a charge-discharge curve for metal Li of a negative electrode active material of Example 12.
Figure 14:
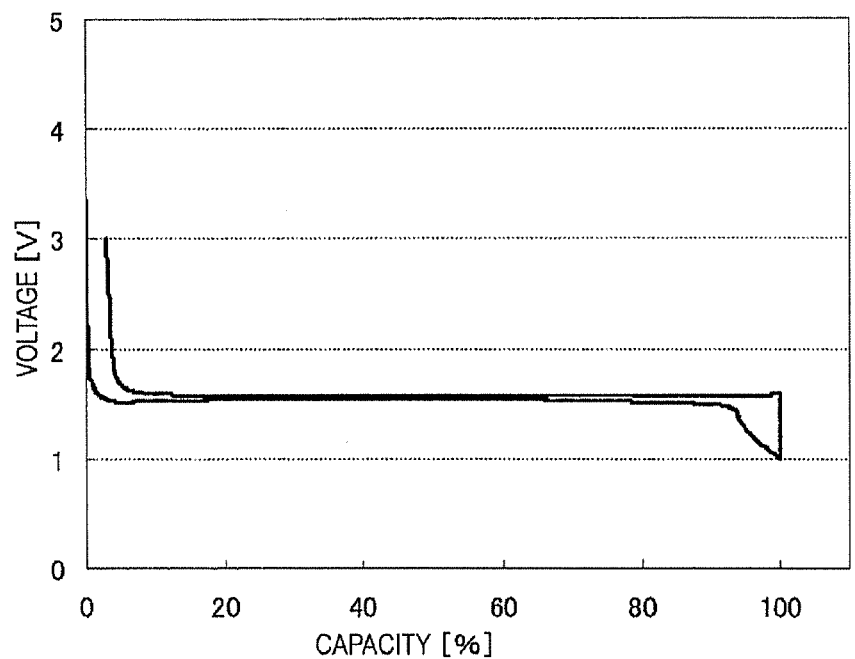
FIG. 14 shows a charge-discharge curve for metal Li of a negative electrode active material of Example 13.
Figure 15:
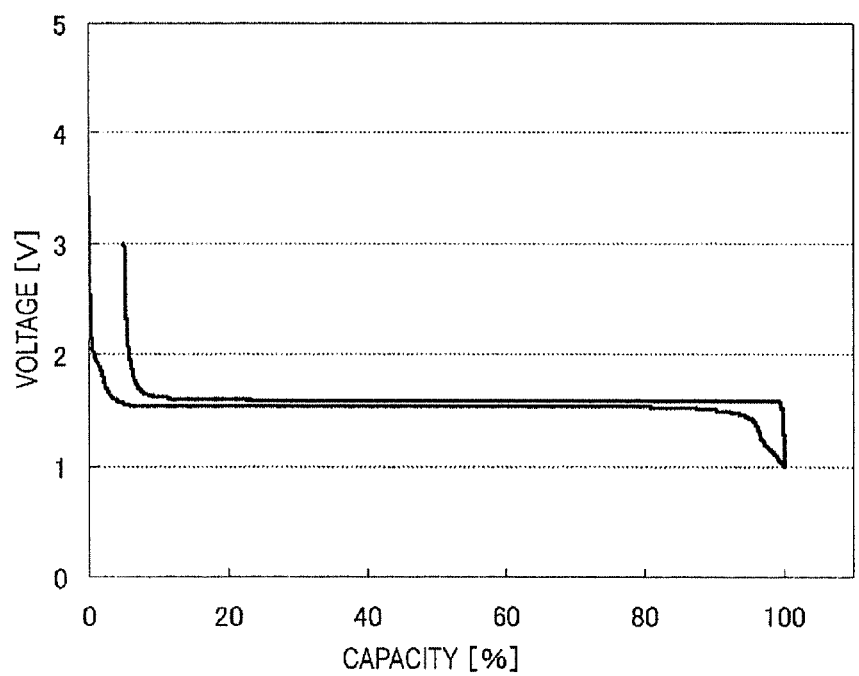
FIG. 15 shows a charge-discharge curve for metal Li of a negative electrode active material of Example 14.
Figure 16:
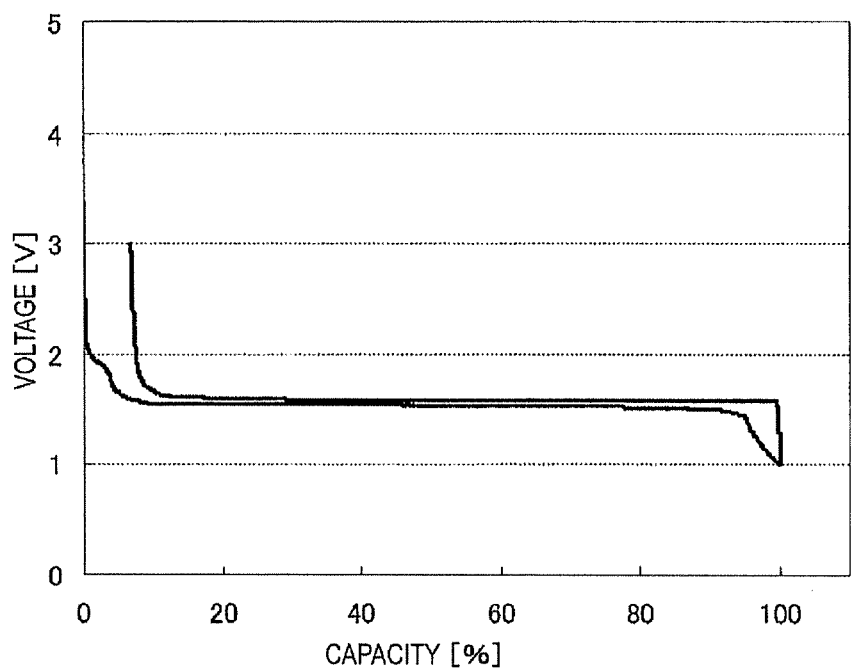
FIG. 16 shows a charge-discharge curve for metal Li of a negative electrode active material of Example 15.
Figure 17:
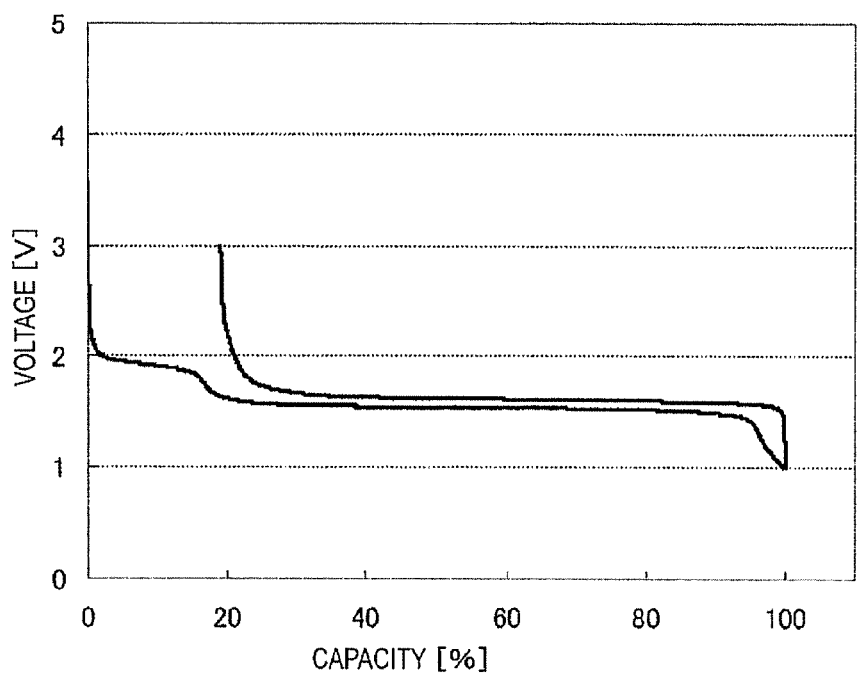
FIG. 17 shows a charge-discharge curve for metal Li of a negative electrode active material of Example 16.
Figure 18:
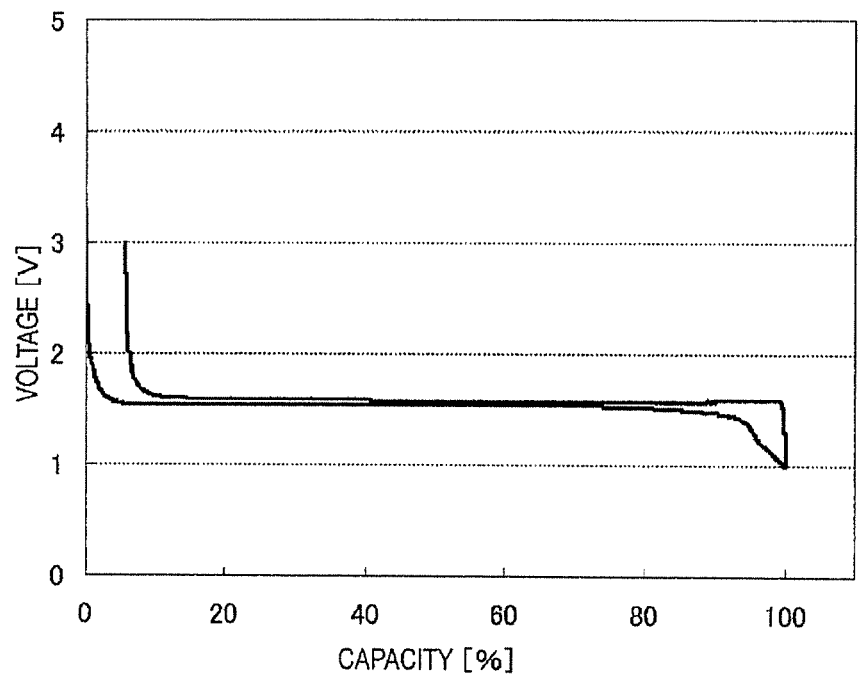
FIG. 18 shows a charge-discharge curve for metal Li of a negative electrode active material of Example 17.
Figure 19:
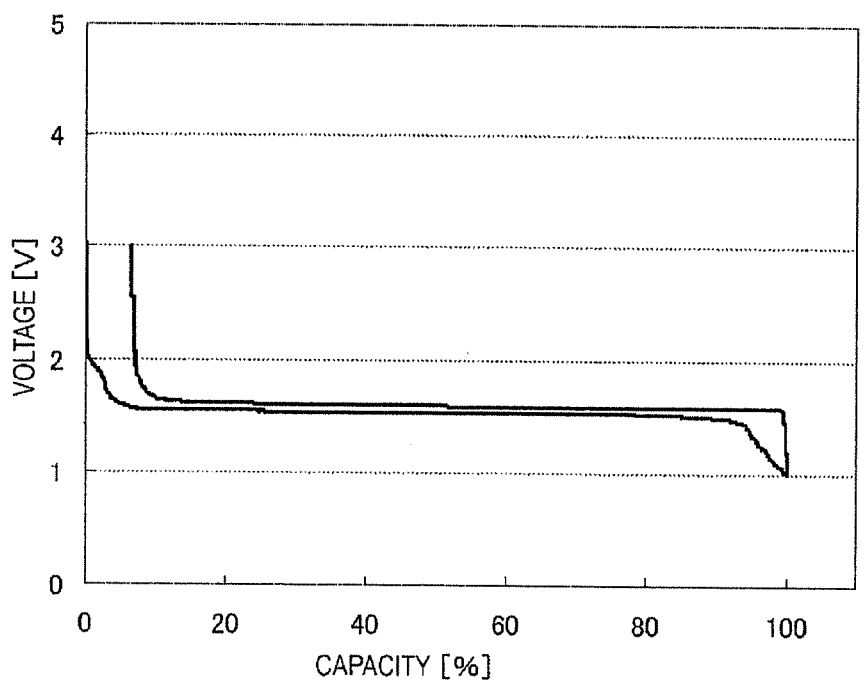
FIG. 19 shows a charge-discharge curve for metal Li of a negative electrode active material of Example 18.
Figure 20:
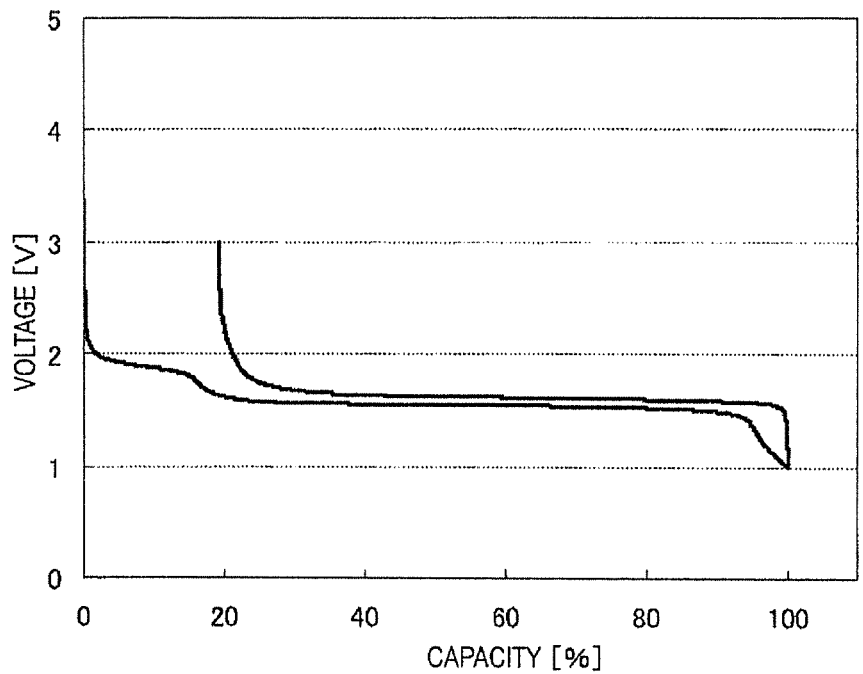
FIG. 20 shows a charge-discharge curve for metal Li of a negative electrode active material of Example 19.
Figure 21:
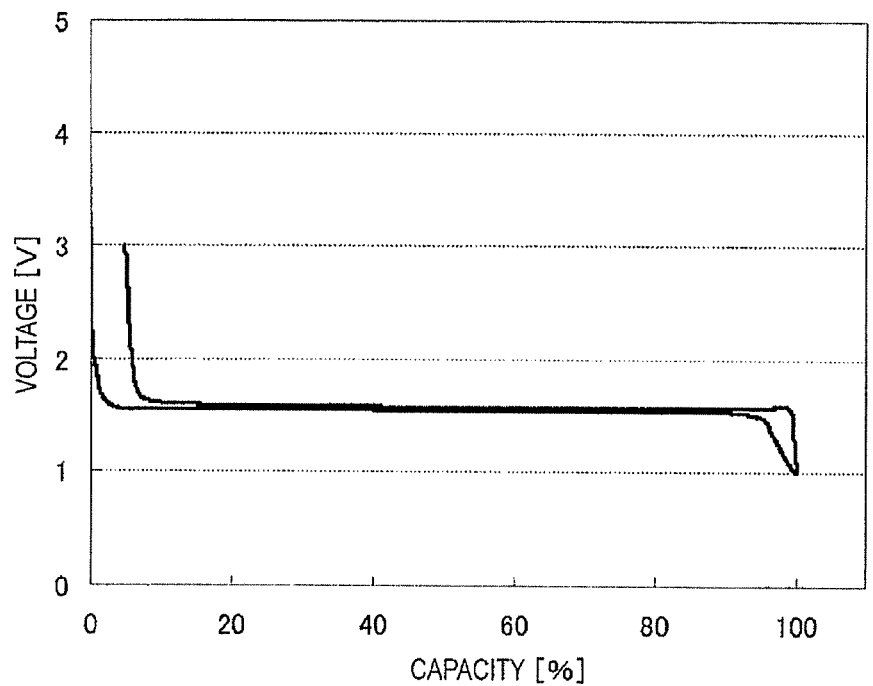
FIG. 21 shows a charge-discharge curve for metal Li of a negative electrode active material of Example 20.
Figure 22:
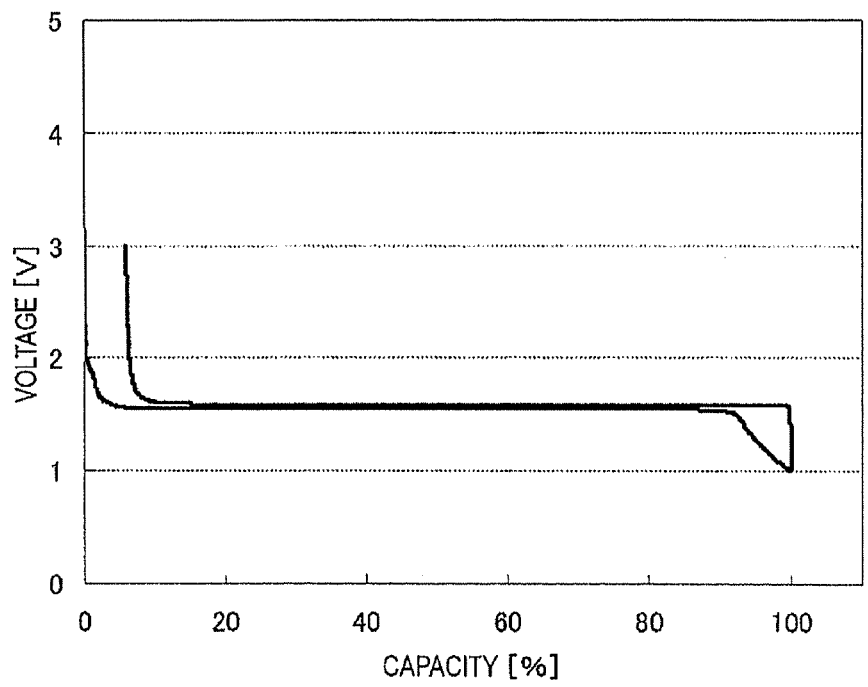
FIG. 22 shows a charge-discharge curve for metal Li of a negative electrode active material of Example 21.
Figure 23:
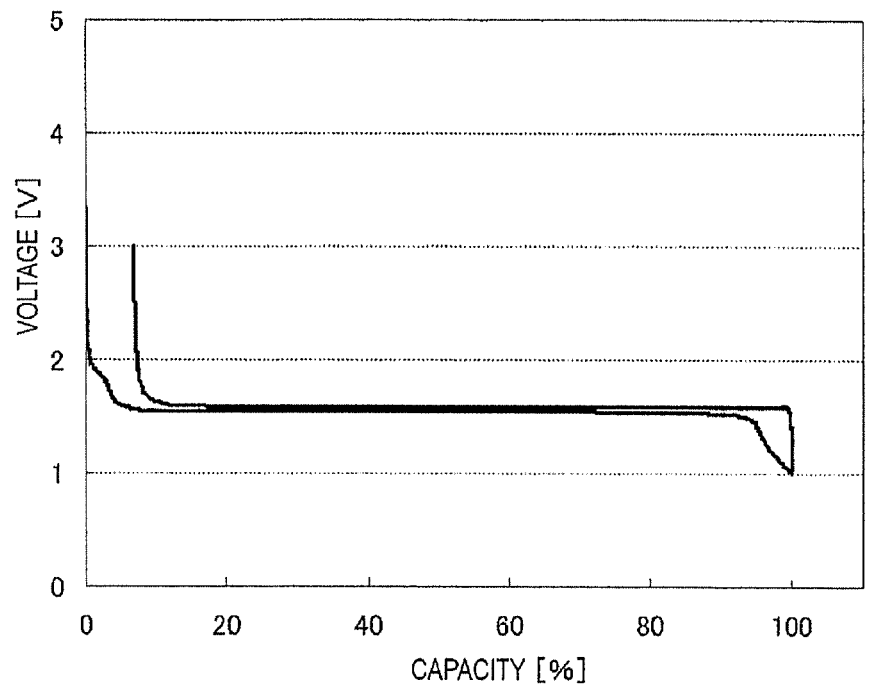
FIG. 23 shows a charge-discharge curve for metal Li of a negative electrode active material of Example 22.
Figure 24:
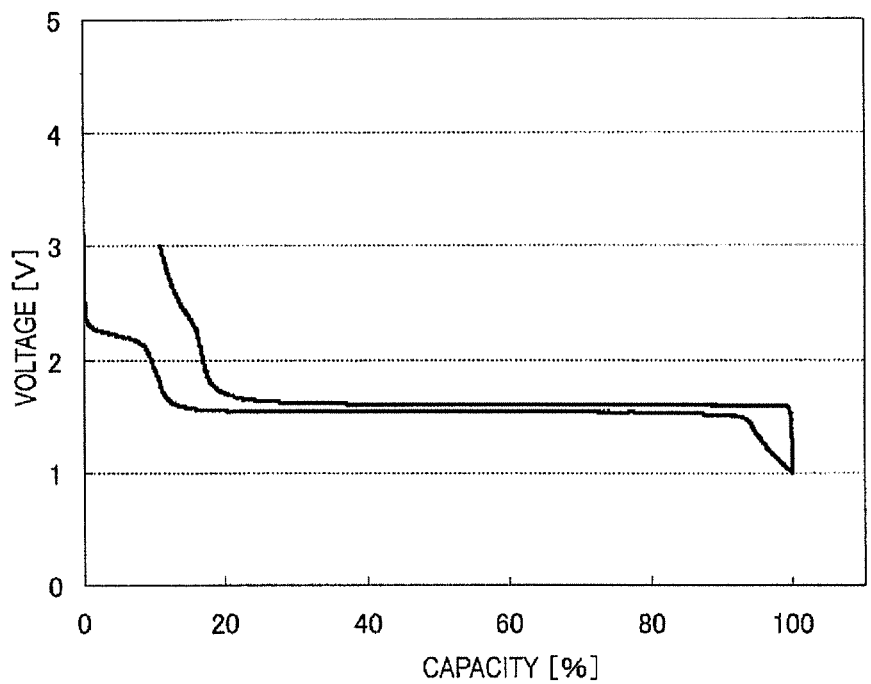
FIG. 24 shows a charge-discharge curve for metal Li of a negative electrode active material of Example 23.
Figure 25:
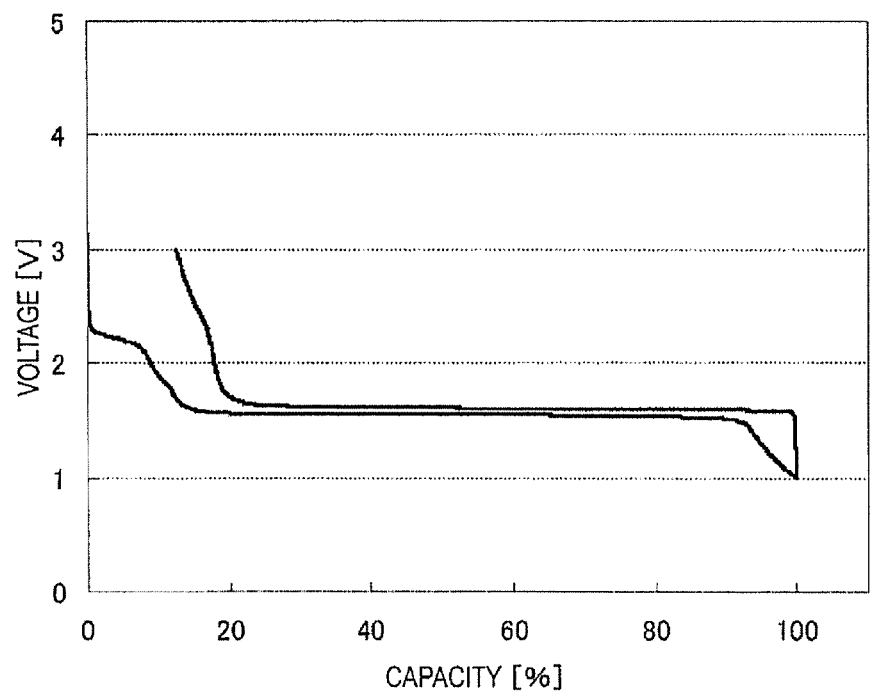
FIG. 25 shows a charge-discharge curve for metal Li of a negative electrode active material of Example 24.
Figure 26:
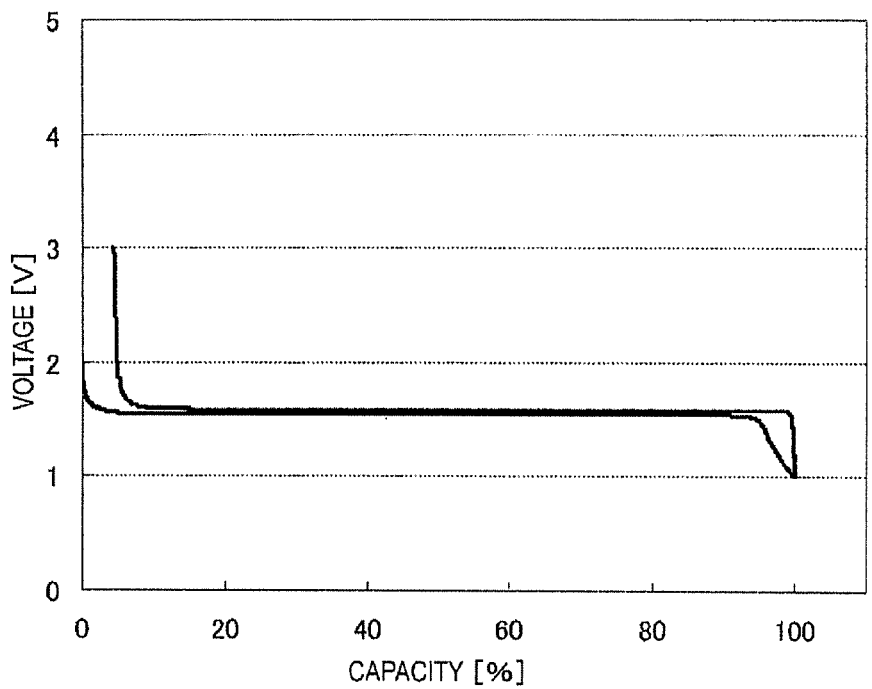
FIG. 26 shows a charge-discharge curve for metal Li of a negative electrode active material of Example 25.
Figure 27:
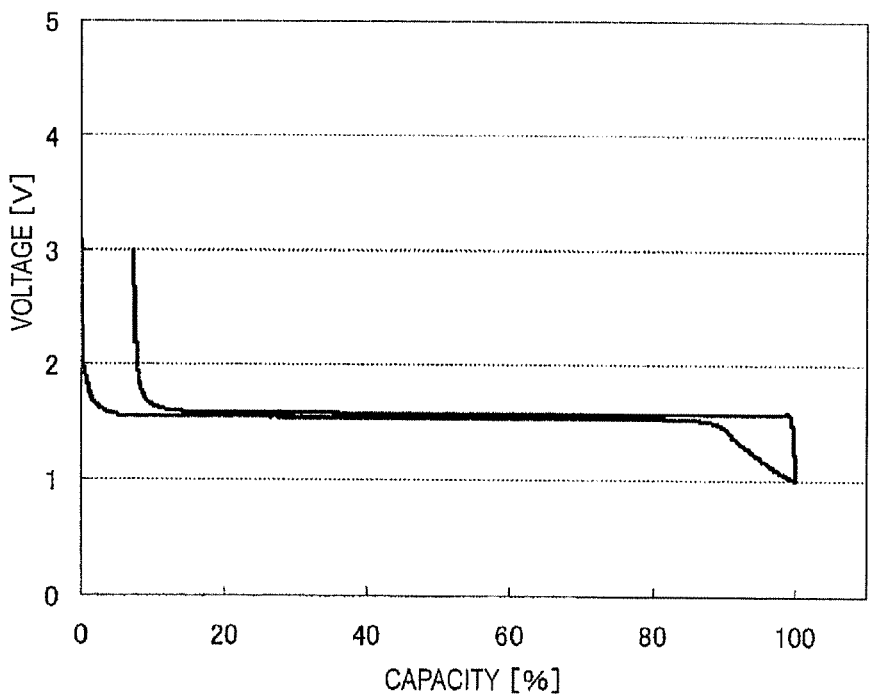
FIG. 27 shows a charge-discharge curve for metal Li of a negative electrode active material of Example 26.
Figure 28:
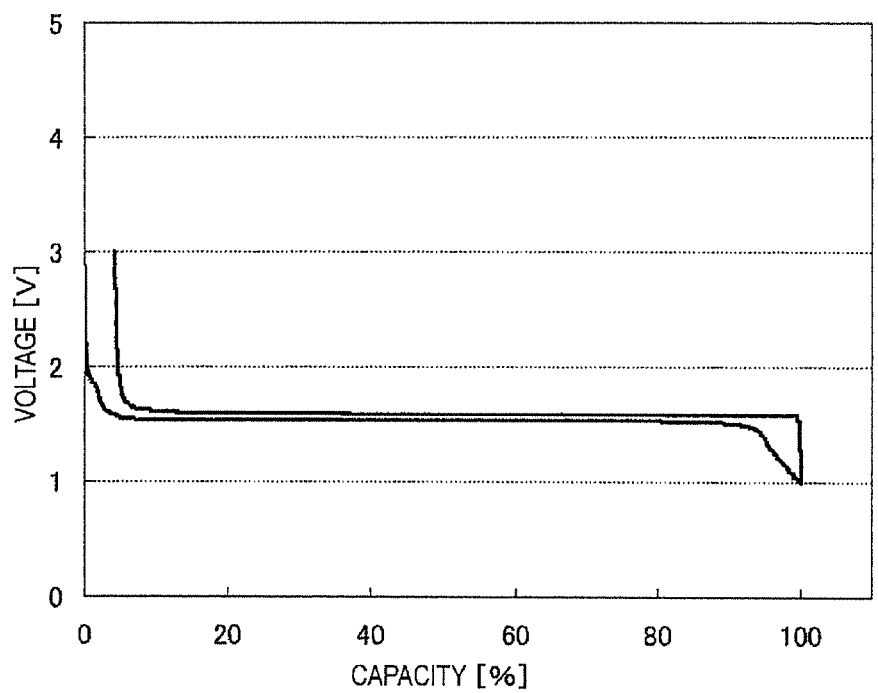
FIG. 28 shows a charge-discharge curve for metal Li of a negative electrode active material of Example 27.
Figure 29:
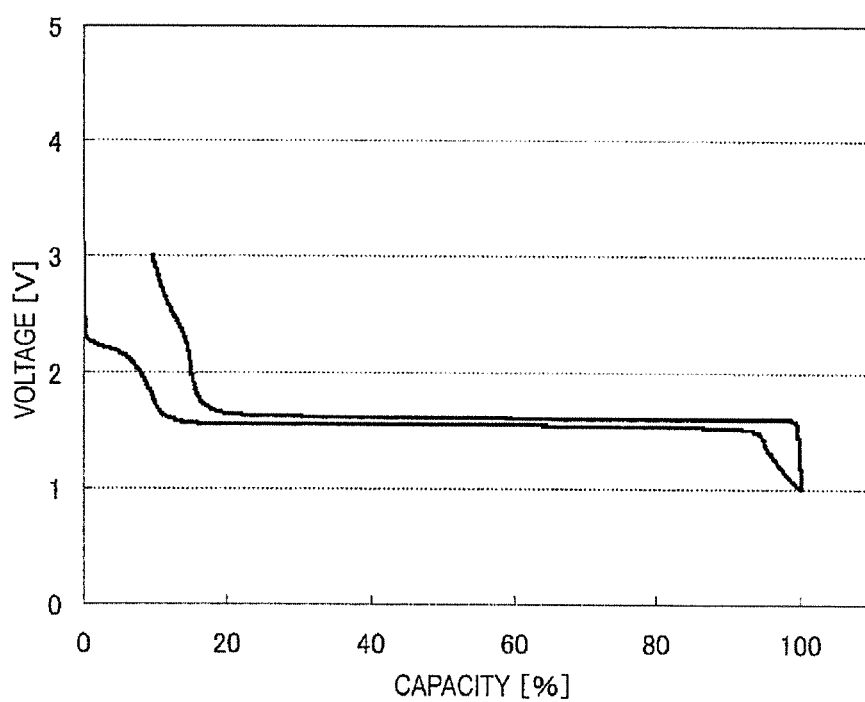
FIG. 29 shows a charge-discharge curve for metal Li of a negative electrode active material of Example 28.
Figure 30:
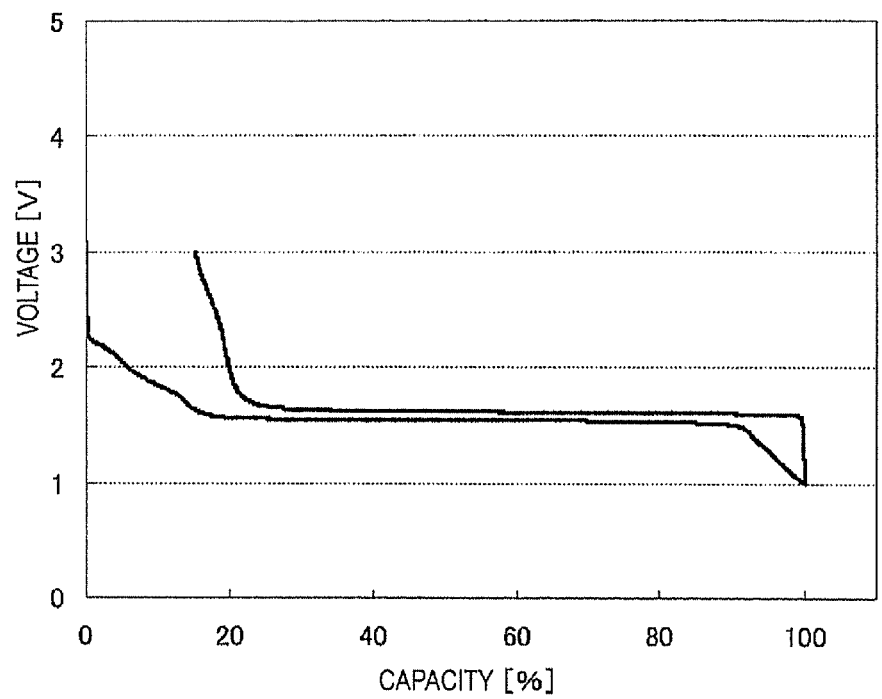
FIG. 30 shows a charge-discharge curve for metal Li of a negative electrode active material of Example 29.
Figure 31:
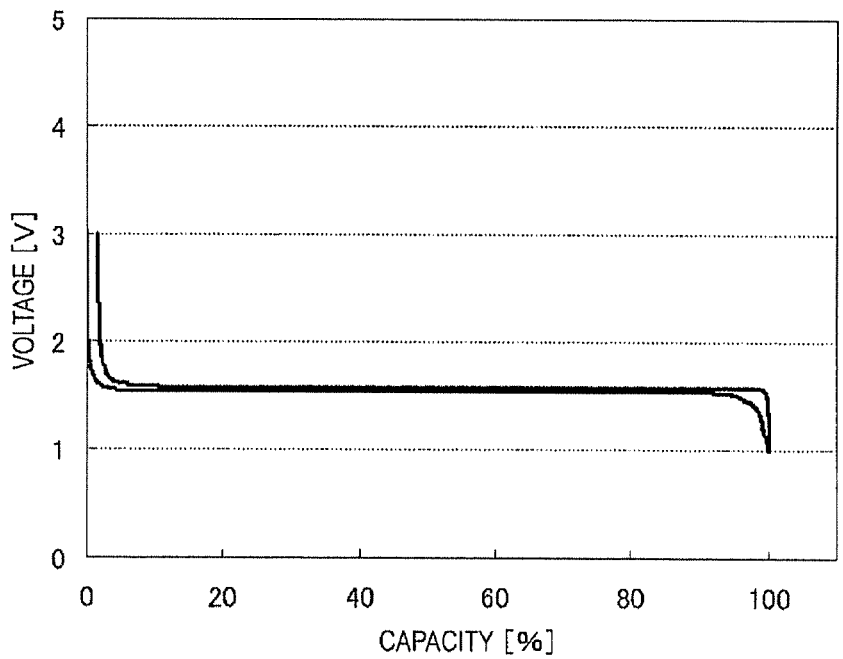
FIG. 31 shows a charge-discharge curve for metal Li of a negative electrode active material of Comparative Example 1.

FIG. 1C shows an example of a charge-discharge curve for the positive electrode and the negative electrode of the nonaqueous electrolyte secondary battery of the present embodiment. FIG. 1C shows an example where $Li_4Ti_{4.7}Mn_{0.3}O_{12}$ is used as the negative electrode active material, and $LiNi_{0.81}Co_{0.15}Al_{0.04}O_2$ is used as the positive electrode active material. Qa and Qc show the irreversible capacity rates (also referred to as retentions) of the negative electrode and the positive electrode, respectively. As shown below, the irreversible capacity rates Qa and Qc are defined each as the percentage (%) of the capacity, of the charging capacity, that cannot be discharged with respect to the charging capacity. In the nonaqueous electrolyte secondary battery of the present embodiment, the charging capacity (initial capacity) of the positive electrode active material and that of the negative electrode active material are equal to each other. The positive electrode and the negative electrode are not subjected to preliminary charging, or the like.

$$Qa = \frac{ChargingCapacity[mAh] - DischargingCapacity[mAh]}{ChargingCapacity[mAh]} \times 100 \quad \text{[Expression 1]}$$

$$Qc = \frac{ChargingCapacity[mAh] - DischargingCapacity[mAh]}{ChargingCapacity[mAh]} \times 100$$

As shown in FIG. 1C, in the nonaqueous electrolyte secondary battery of the present embodiment, the irreversible capacity rate Qa of the negative electrode is greater than the irreversible capacity rate Qc of the positive electrode. Therefore, when the nonaqueous electrolyte secondary battery of the present embodiment is discharged, before the potential of the positive electrode decreases, the potential of the negative electrode increases significantly and the battery voltage rapidly decreases, whereby the voltage of the nonaqueous electrolyte secondary battery reaches the discharge end voltage Ve. With such a configuration, it is possible to realize a nonaqueous electrolyte secondary battery, particularly a lithium ion secondary battery, of the negative electrode limitation type. As a result, it is possible to prevent a potential drop of the positive electrode during a discharge, suppress deterioration of the layered positive electrode of the positive electrode active material, and improve the cycle characteristics. When a discharge ends, the potential of the negative electrode is Va. At this point, at the negative electrode, there is little Li that can be released. On the other hand, when a discharge ends, the potential of the positive electrode is Vc. At this point, the positive electrode is still capable of absorbing Li.

The negative electrode active material used in the nonaqueous electrolyte secondary battery of the present embodiment has a spinel crystalline structure. This can easily be confirmed by X-ray diffraction, or the like. The negative electrode active material is composed of a lithium-containing transition metal oxide in which some of Ti element of the lithium-containing titanium oxide is substituted with one or more element different from Ti. By substituting some of Ti element of the lithium-containing titanium oxide with at least one element different from Ti, it is possible to realize a nonaqueous electrolyte secondary battery of the negative electrode limitation type having a greater irreversible capacity rate than a lithium-containing titanium oxide.

For example, examples of a lithium-containing titanium oxide having a spinel crystalline structure include $Li_4Ti_5O_{12}$. It may also be a lithium-containing titanium oxide having a different composition, such as $LiTi_2O_4$, as long as it has a spinel crystalline structure.

The negative electrode active material used in the present embodiment is composed of a lithium-containing transition metal oxide in which some of Ti element of such a lithium-containing titanium oxide is substituted with one or more element different from Ti. Specific examples of the negative electrode active material include a compound represented as $Li_4Ti_{5-w}Mn_wO_{12}$ (0<w≤0.3), a compound represented as $Li_4Ti_{5-x}Fe_xO_{12}$ (0<x≤0.3), a compound represented as $Li_4Ti_{5-y}V_yO_{12}$ (0<y≤0.05), a compound represented as $Li_4Ti_{5-z}B_zO_{12}$ (0<z≤0.3), a compound represented as $Li_4Ti_{5-w-y}Mn_wV_yO_{12}$ (0<w≤0.3, 0<y≤0.05), a compound represented as $Li_4Ti_{5-w-z}Mn_wB_zO_{12}$ (0<w≤0.3, 0<z≤0.3), a compound represented as $Li_4Ti_{5-x-y}Fe_xV_yO_{12}$ (0<x≤0.3, 0<y≤0.05), a compound represented as $Li_4Ti_{5-x-z}Fe_xB_zO_{12}$ (0<x≤0.3, 0<z≤0.3), and the like.

With the compound represented as $Li_4Ti_{5-w}Mn_wO_{12}$ (0<w≤0.3), it is possible to obtain a greater irreversible capacity rate than $Li_4Ti_5O_{12}$ by substituting some of Ti element of $Li_4Ti_5O_{12}$ with Mn element. Possible reasons for this include: (1) while it is believed that Mn element substituting some of Ti element is present in a trivalent or tetravalent form, it is easily reduced during an initial charge and is little oxidized during a discharge; and (2) being partly substituted with Mn element, the structure is strained so that some of the Ti element reduced during the initial charge takes such a form that it is unlikely to be oxidized during a discharge. When a charge-discharge evaluation is actually conducted using the compound represented as $Li_4Ti_5Mn_wO_{12}$ (0<w≤0.3) as the active material, the initial charge curve not only has a plateau (P1) in the vicinity of 1.55 V (the dissolution-deposition potential reference of metal Li), which is characteristically observed with $Li_4Ti_5O_{12}$, but also has a plateau (P2) in the vicinity of about 2.0 to 2.1 V, as shown in FIG. 1C. Therefore, it is believed that the plateau (P2) in the vicinity of about 2.0 to 2.1 V is from the reduction of Mn element. As shown in FIG. 1C, the discharge curve has no plateau in the vicinity of about 2.0 to 2.1 V, indicating that no discharge occurs at the potential (about 2.0 to 2.1 V) of the plateau (P2) during the initial charge. Therefore, it is believed that Mn element contained in the compound represented as $Li_4Ti_5Mn_wO_{12}$ (0<w≤0.3) is present un-oxidized after being reduced, which is thought to be the main reason for the increase in the irreversible capacity rate.

With the compound represented as $Li_4Ti_{5-x}Fe_xO_{12}$ (0<x≤0.3), it is possible to obtain a greater irreversible capacity rate than $Li_4Ti_5O_{12}$ by substituting some of Ti element of $Li_4Ti_5O_{12}$ with Fe element. Possible reasons for this include: (1) while it is believed that Fe element substituting some of Ti element is present in a trivalent form, it is easily reduced during an initial charge and is unlikely to be oxidized during a discharge; and (2) being partly substituted with Fe element, the structure is strained so that some of the Ti element reduced during the initial charge takes such a form that it is unlikely to be oxidized during a discharge. When a charge-discharge evaluation is actually conducted using the compound represented as $Li_4Ti_{5-x}Fe_xO_{12}$ (0<x≤0.3) as the active material, the charge-discharge curve not only has a plateau in the vicinity of 1.55 V (the dissolution-deposition potential reference of metal Li), which is characteristically observed with $Li_4Ti_5O_{12}$, but also has a plateau in the vicinity of about 2.0 to 2.3 V. Therefore, it is believed that the plateau in the vicinity of about 2.0 to 2.3 V is from the oxidization and reduction of Fe element. The capacity change over the plateau in the vicinity of about 2.0 to 2.3 V in the charge-discharge curve is such that charging capacity >discharging capacity. Therefore, it is believed that Fe element contained in the compound represented as $Li_4Ti_{5-x}Fe_xO_{12}$ (0<x≤0.3) partly becomes stable and some of it is present un-oxidized after being reduced, which is thought to be the main reason for the increase in the irreversible capacity rate.

With the compound represented as $Li_4Ti_{5-y}V_yO_{12}$ (0<y≤0.05), it is possible to obtain a greater irreversible capacity rate than $Li_4Ti_5O_{12}$ by substituting some of Ti element of $Li_4Ti_5O_{12}$ with V element. Possible reasons for this include: (1) while it is believed that V element substituting some of Ti element is present in a pentavalent form, it is easily reduced during an initial charge and is unlikely to be oxidized during a discharge; and (2) being partly substituted with V element, the structure is strained so that some of the Ti element reduced during the initial charge takes such a form that it is unlikely to be oxidized during a discharge. When a charge-discharge evaluation is actually conducted using the compound represented as $Li_4Ti_{5-y}V_yO_{12}$ (0<y≤0.05) as the active material, the initial charging curve not only has a plateau in the vicinity of 1.55 V (the dissolution-deposition potential reference of metal Li), which is characteristically observed with $Li_4Ti_5O_{12}$, but also has a plateau in the vicinity of about 1.8 to 2.0 V. Therefore, it is believed that the plateau in the vicinity of about 1.8 to 2.0 V is from the reduction of V element. The discharge curve has no plateau in the vicinity of about 1.8 to 2.0 V, indicating that no discharge occurs at the potential (about 2.0 to 2.1 V) of the plateau during the initial charge. Therefore, it is believed that V element contained in the compound represented as $Li_4Ti_{5-y}V_yO_{12}$ (0<y≤0.05) is present un-oxidized after being reduced, which is thought to be the main reason for the increase in the irreversible capacity rate.

With the compound represented as $Li_4Ti_{5-z}B_zO_{12}$ (0<z≤0.3), it is possible to obtain a greater irreversible capacity rate than $Li_4Ti_5O_{12}$ by substituting some of Ti element of $Li_4Ti_5O_{12}$ with B element. A possible reason for this is that being partly substituted with B element, the structure is strained so that some of the Ti element reduced during the initial charge takes such a form that it is unlikely to be oxidized during a discharge. When a charge-discharge evaluation is actually conducted using the compound represented as $Li_4Ti_{5-z}B_zO_{12}$ (0<z≤0.3) as the active material, the only plateau observed during the initial charge and discharge is the one in the vicinity of 1.55 V (the dissolution-deposition potential reference of metal Li), which is characteristically observed with $Li_4Ti_5O_{12}$. This suggests that B element is not oxidized and reduced. As the amount z of substitution with B element is increased, the charging capacity and the discharging capacity both decrease, but since the rate of decrease of the discharging capacity is slightly higher, the irreversible capacity rate is slightly higher than $Li_4Ti_5O_{12}$. The magnitude of the irreversible capacity rate is not very dependent on the amount of addition of B element. This also suggests that B element is not oxidized and reduced.

With the compound represented as $Li_4Ti_{5-w-y}Mn_wV_yO_{12}$ (0<w≤0.3, 0<y≤0.05), it is believed that the irreversible capacity rate is increased as some of Ti element is substituted with Mn element, for a similar reason to that with the compound represented as $Li_4Ti_{5-w}Mn_wO_{12}$ (0<w≤0.3) described above. Moreover, it is believed that the irreversible capacity rate is increased as some of Ti element is substituted with V element, for a similar reason to that with the compound represented as $Li_4Ti_{5-y}V_yO_{12}$ (0<y≤0.05).

When a charge-discharge evaluation is actually conducted using the compound represented as $Li_4Ti_{5-w-y}Mn_xV_yO_{12}$ (0<w≤0.3, 0<y≤0.05) as the active material, the initial charging curve not only has a plateau in the vicinity of 1.55 V (the dissolution-deposition potential reference of metal Li), which is characteristically observed with $Li_4Ti_5O_{12}$, but also has a plateau in the vicinity of about 1.8 to 2.0 V. Therefore, it is believed that the plateau in the vicinity of about 1.8 to 2.0 V is from the reduction of Mn element and V element. A slightly lower potential was obtained, as compared with the potential of about 2.0 to 2.1 V when it is substituted only with Mn element. It is believed that the reason for this is the electronic interaction or the interaction due to the strain in the crystalline structure between Mn element and V element.

With the compound represented as $Li_4Ti_{5-w-z}Mn_wB_zO_{12}$ (0<w≤0.3, 0<z≤0.3), it is believed that the irreversible capacity rate is increased as some of Ti element is substituted with Mn element, for a similar reason to that with the compound represented as $Li_4Ti_{5-w}Mn_wO_{12}$ (0<w≤0.3) described above. Moreover, it is believed that the irreversible capacity rate is increased as some of Ti element is substituted with B element, for a similar reason to that with the compound represented as $Li_4Ti_{5-z}B_zO_{12}$ (0<z≤0.3). When a charge-discharge evaluation is actually conducted using the compound represented as $Li_4Ti_5Mn_wB_zO_{12}$ (0<w≤0.3, 0<z≤0.3) as the active material, the initial charging curve not only has a plateau in the vicinity of 1.55 V (the dissolution-deposition potential reference of metal Li), which is characteristically observed with $Li_4Ti_5O_{12}$, but also has a plateau in the vicinity of about 1.8 to 2.0 V. Therefore, it is believed that the plateau in the vicinity of about 1.8 to 2.0 V is from the reduction of Mn element. A slightly lower potential was obtained, as compared with the potential of about 2.0 to 2.1 V when it is substituted only with Mn element. It is believed that the reason for this is the electronic interaction or the interaction due to the strain in the crystalline structure between Mn element and B element.

With the compound represented as $Li_4Ti_{5-x-y}Fe_xV_yO_{12}$ (0<x≤0.3, 0<y≤0.05), it is believed that the irreversible capacity rate is increased as some of Ti element is substituted with Fe element, for a similar reason to that with the compound represented as $Li_4Ti_5Fe_xO_{12}$ (0<x≤0.3) described above. Moreover, it is believed that the irreversible capacity rate is increased as some of Ti element is substituted with V element, for a similar reason to that with the compound represented as $Li_4Ti_{5-y}V_yO_{12}$ (0<y≤0.05). When a charge-discharge evaluation is actually conducted using the compound represented as $Li_4Ti_{5-x-y}Fe_xV_yO_{12}$ (0<x≤0.3, 0<y≤0.05) as the active material, the initial charging curve not only has a plateau in the vicinity of 1.55 V (the dissolution-deposition potential reference of metal Li), which is characteristically observed with $Li_4Ti_5O_{12}$, but also has a plateau in the vicinity of about 2.0 to 2.3 V and a plateau in the vicinity of about 1.8 to 2.0 V. Therefore, it is believed that the plateau in the vicinity of about 2.0 to 2.3 V is from the reduction of Fe element. It is believed that based on the capacity, the plateau in the vicinity of about 1.8 to 2.0 V is from the reduction of both Fe element and V element. There was also a plateau from the reduction of Fe element at a slightly lower potential, as compared with a case where the only potential is about 2.0 to 2.3 V when it is substituted only with Fe element. It is believed that the reason for this is the electronic interaction or the interaction due to the strain in the crystalline structure between Fe element and V element.

With the compound represented as $Li_4Ti_{5-x-z}Fe_xB_zO_{12}$ (0<x≤0.3, 0<z≤0.3), it is believed that the irreversible capacity rate is increased as some of Ti element is substituted with Fe element, for a similar reason to that with the compound represented as $Li_4Ti_{5-x}Fe_xO_{12}$ (0<x≤0.3) described above. Moreover, it is believed that the irreversible capacity rate is increased as some of Ti element is substituted with B element, for a similar reason to that with the compound represented as $Li_4Ti_{5-z}B_zO_{12}$ (0<z≤0.3). When a charge-discharge evaluation is actually conducted using the compound represented as $Li_4Ti_{5-x-z}Fe_xB_zO_{12}$ (0<x≤0.3, 0<z≤0.3) as the active material, the initial charging curve not only has a plateau in the vicinity of 1.55 V (the dissolution-deposition potential reference of metal Li), which is characteristically observed with $Li_4Ti_5O_{12}$, but also has a plateau in the vicinity of about 1.8 to 2.0 V. It is believed that the plateau in the vicinity of about 2.0 to 2.3 V and the plateau in the vicinity of about 1.8 to 2.0 V is from the reduction of Fe element. There was also a plateau from the reduction of Fe element at a slightly lower potential, as compared with a case where the only potential is about 2.0 to 2.3 V when it is substituted only with Fe element. It is believed that the reason for this is the electronic interaction or the interaction due to the strain in the crystalline structure between Fe element and B element.

A positive electrode active material contained in a nonaqueous electrolyte secondary battery of the present embodiment has a layered crystalline structure. This can easily be confirmed by X-ray diffraction, or the like. The positive electrode active material contains at least one compound represented as $Li_aNi_{1-b-c}Co_bM_cO_2$ (0.95≤a≤1.12, 0≤b≤1, 0≤c≤0.50, 0≤b+c≤1, M is at least one element selected from the group consisting of Al, Mn, Ti, Mg, Mo, Y, Zr and Ca). Particularly, it is preferred in terms of the capacity, the cycle characteristics, etc., that it contains at least one of a compound whose chemical formula is represented as $LiCoO_2$, a compound whose chemical formula is represented as $LiNi_{1/3}Mn_{1/3}Co_{1/3}O_2$, and a compound whose chemical formula is represented as $LiNi_{0.81}Co_{0.15}Al_{0.4}O_2$. The positive electrode active material is not limited to those, but may be any other active material as long as it is an active material having a layered crystalline structure.

A nonaqueous electrolyte secondary battery further includes a nonaqueous electrolyte. The nonaqueous electrolyte is arranged in the separator and around the negative electrode and the positive electrode as it is provided to fill the inside of the battery case 6, which accommodates the group of electrodes 3 therein. After injecting the nonaqueous electrolyte, the opening of the battery case 6 is sealed with the sealing plate 7 with a gasket 8 attached to the peripheral portion thereof. A safety valve may be provided on the sealing plate. Other than the safety valve, any of various safety devices known in the art may be provided. For example, a fuse, a bimetal, a PTC element, or the like, is used as an overcurrent preventing element. As a countermeasure against an increase in the internal pressure of the battery case, other than a safety valve, it is possible to use known measures such as disconnecting the electrically connected portion between the positive electrode lead and the terminal portion of the sealing plate when the internal pressure increases abnormally.

The nonaqueous electrolyte of the nonaqueous electrolyte secondary battery of the present embodiment may be an organic solvent, an ion liquid, a gel-like substance, a solid substance, or a combination thereof, having Li ion conductivity. Specific examples of the organic solvent include cyclic carbonates such as ethylene carbonate, propylene carbonate, butylene carbonate and vinylene carbonate, acyclic carbonates such as dimethyl carbonate, diethyl carbonate, ethylmethyl carbonate and dipropyl carbonate, fluorine-containing cyclic saturated hydrocarbons, and mixed solvents thereof with a lithium salt such as $LiPF_6$ or $LiBF_4$ dissolved therein.

The separator of the nonaqueous electrolyte secondary battery of the present embodiment may be a polyolefin microporous membrane, non-woven fabric, or the like. The material of the non-woven fabric may be polyester, cellulose, or the like.

In the present embodiment and in Examples below, the positive electrode active material and the negative electrode active material of the nonaqueous electrolyte secondary battery have an equal charging capacity (initial capacity). However, the nonaqueous electrolyte secondary battery of the present invention is not limited to such a configuration. As described above, since the negative electrode active material used in the nonaqueous electrolyte secondary battery of the present embodiment has a greater irreversible capacity rate as compared with conventional techniques, it can suppress the decrease in the potential of the positive electrode during a discharge, which would deteriorate the positive electrode active material. Therefore, as long as discharging ends by negative electrode limitation in normal use, the positive electrode active material and the negative electrode active material of the nonaqueous electrolyte secondary battery may have different filling capacities. At least one of the positive electrode and the negative electrode may be subjected to preliminary charging as necessary. Such a nonaqueous electrolyte secondary battery can also be suitably implemented as an embodiment or an example of the present invention.

Examples

Evaluation results will now be shown for irreversible capacity rates of various negative electrode active materials (hereinafter referred to as the first retentions) and irreversible capacity rates of various positive electrode active materials (hereinafter referred to as the second retentions) used in the nonaqueous electrolyte secondary battery of the present embodiment.

As the counter electrode for measuring the first retention and the second retention, metal Li was used, which is commonly used in characteristics evaluation of active materials of nonaqueous electrolyte secondary batteries. It is known that the dissolution-deposition potential of metal Li remains substantially constant during a charge/discharge, which therefore allows for an appropriate evaluation of the reaction potential and the irreversible capacity rate of the positive electrode and negative electrode active materials during a charge/discharge.

1. Preparation of Active Material

Lithium titanium composite oxides having a spinel-type crystalline structure, represented as $Li_4Ti_{5-w}Mn_wO_{12}$, $Li_4Ti_{5-x}Fe_xO_{12}$, $Li_4Ti_{5-y}V_yO_{12}$, $Li_4Ti_{5-z}B_zO_{12}$, $Li_4Ti_{5-w-y}Mn_wV_yO_{12}$, $Li_4Ti_{5-w-z}Mn_wB_zO_{12}$, $Li_4Ti_{5-x-y}Fe_xV_yO_{12}$ or $Li_4Ti_{5-x-z}Fe_xB_zO_{12}$ were used as the negative electrode active materials of Examples 1 to 29. On the other hand, $Li_4Ti_5O_{12}$ was used as the negative electrode active material of Comparative Example 1. The amounts w, x, y and z of Mn, Fe, V and B added in the examples and Comparative Example 1 are shown together in Table 1.

The negative electrode active materials of Examples 1 to 29 and Comparative Example 1 were synthesized by a solid phase reaction method. The material powders of $LiOH·H_2O$, $TiO_2$, $MnO_2$, $Fe_2O_3$, $V_2O_5$ and $HBO_3$ were weighed so that the molar mixing ratio of Li/Ti/Mn/Fe/V/B is 4/(5-w-x-y-z)/w/x/y/z (w, x, y and z are values shown in Table 1 in the examples and the comparative example) to be placed in a mortar and mixed together. The material $TiO_2$ was one which had an anatase-type crystalline structure and an average grain size of about 0.3 µm. The mixed material powder was placed in a crucible made of $Al_2O_3$, and baked in an electric furnace in an air atmosphere. The baking temperature was 850 C, and the baking temperature holding time was 2 hours. The baked material was taken out of the crucible and crushed in a mortar, obtaining a lithium titanium composite oxide of interest.

The positive electrode active material of Example 30 was $LiCoO_2$ having a layered crystalline structure. The positive electrode active material of Example 31 was $LiNi_{1/3}Mn_{1/3}Co_{1/3}O_2$ having a layered crystalline structure. The positive electrode active material of Example 32 was $LiNi_{0.81}Co_{0.15}Al_{0.04}O_2$ having a layered crystalline structure.

TABLE 1

| Negative electrode | Amount of Mn added (w) | Amount of Fe added (x) | Amount of V added (y) | Amount of B added (z) |
|---|---|---|---|---|
| Example 1 | 0.01 | 0 | 0 | 0 |
| Example 2 | 0.05 | 0 | 0 | 0 |
| Example 3 | 0.1 | 0 | 0 | 0 |
| Example 4 | 0.3 | 0 | 0 | 0 |
| Example 5 | 0 | 0.01 | 0 | 0 |
| Example 6 | 0 | 0.05 | 0 | 0 |
| Example 7 | 0 | 0.1 | 0 | 0 |
| Example 8 | 0 | 0.3 | 0 | 0 |
| Example 9 | 0 | 0 | 0.01 | 0 |
| Example 10 | 0 | 0 | 0.05 | 0 |
| Example 11 | 0 | 0 | 0 | 0.05 |
| Example 12 | 0 | 0 | 0 | 0.1 |
| Example 13 | 0 | 0 | 0 | 0.3 |
| Example 14 | 0.01 | 0 | 0.05 | 0 |
| Example 15 | 0.05 | 0 | 0.05 | 0 |
| Example 16 | 0.3 | 0 | 0.05 | 0 |
| Example 17 | 0.01 | 0 | 0 | 0.3 |
| Example 18 | 0.05 | 0 | 0 | 0.05 |
| Example 19 | 0.3 | 0 | 0 | 0.3 |
| Example 20 | 0 | 0.01 | 0.01 | 0 |
| Example 21 | 0 | 0.01 | 0.05 | 0 |
| Example 22 | 0 | 0.05 | 0.05 | 0 |
| Example 23 | 0 | 0.3 | 0.01 | 0 |
| Example 24 | 0 | 0.3 | 0.05 | 0 |
| Example 25 | 0 | 0.01 | 0 | 0.01 |
| Example 26 | 0 | 0.01 | 0 | 0.3 |
| Example 27 | 0 | 0.05 | 0 | 0.05 |
| Example 28 | 0 | 0.3 | 0 | 0.01 |
| Example 29 | 0 | 0.3 | 0 | 0.3 |
| Comparative Example 1 | 0 | 0 | 0 | 0 |

2. Production of Electrode

Electrodes were produced, using the negative electrode active materials of Examples 1 to 29 and Comparative Example 1 and the positive electrode active materials of Examples 30 to 32. An active material/an electrically conductive material/a binder were weighed so that the weight ratio therebetween is 85/10/5, and mixed in a mortar. Acetylene black was used as the electrically conductive material, and polytetrafluoroethylene (PTFE) as the binder. After mixing, it was rolled with a roller, and punched into pellet-shaped electrodes.

3. Production of Battery (for Retention Evaluation)

Coin-shaped batteries were produced. The electrode described above produced using Examples 1 to 32 and Comparative Example 1, a separator impregnated with an electrolytic solution and a metal Li plate were stacked together in this order, put in a coin-shaped case, and sealed, to obtain a battery. The separator was a three-layer separator including a PE microporous membrane from Asahi Kasei E-materials Corporation and a PP non-woven fabric from Tapyrus Co., Ltd., layered together in the order PP/PE/PP. The electrolytic solution included 1 mol/L of $LiPF_6$ dissolved in a solvent mixed so that EC/EMC=1/3.

4. Evaluation of First Retention

The produced batteries of Examples 1 to 29 and Comparative Example 1 were once charged and then discharged in order to measure the first retention of the negative electrode active material. The first retention is the irreversible capacity rate at the first cut-off voltage. The first cut-off voltage refers to the electrode potential in a region of the charge-discharge curve during the last period of a discharge where the remaining capacity hardly changes but the potential changes rapidly. Since the active material to be evaluated is the active material used for the negative electrode, charging in this test is a reaction in such a direction that the potential of the negative electrode active material is lowered, i.e., a reaction that decreases the voltage as a secondary battery with the counter electrode being Li. Discharging is a reaction in the opposite direction. A charge-discharge system from Nagano Co., Ltd. was used for the charge-discharge test. The charge-discharge was performed so that the voltage range was 1 V to 3 V, i.e., so that the first cut-off voltage was 3 V. It was performed so that the current rate was 0.02 C rate. Herein, 1 C rate is defined as a current value representing the discharge rate over 1 hour, and 0.02 C rate is the current value that is 0.02 time 1 C rate, i.e., a current value representing the discharge rate over 50 hours.

FIGS. 2 to 31 show charge-discharge curves during the initial charge and discharge for the negative electrode active materials, measured as described above. For the sake of simplicity, the horizontal axis represents the capacity proportion with 100% being the capacity when fully charged in the initial charge and discharge. The discharge curve is drawn to extend backwards starting from 100%. The vertical axis represents the voltage of the battery with reference to the standard redox potential of lithium.

The irreversible capacity rate in the initial charge and discharge, i.e., the first retention, is calculated by the following expression.

First retention (%)=100−discharging capacity (mAh)/charging capacity (mAh)×100

Table 2 shows the first retentions of the negative electrode active materials of Examples 1 to 29 and Comparative Example 1 as examined by the method described above.

TABLE 2

| Negative electrode | First retention (%) |
|---|---|
| Example 1 | 4.8 |
| Example 2 | 6.9 |
| Example 3 | 7.3 |
| Example 4 | 17.8 |
| Example 5 | 4.0 |
| Example 6 | 4.8 |
| Example 7 | 5.9 |
| Example 8 | 9.3 |
| Example 9 | 3.3 |
| Example 10 | 3.7 |
| Example 11 | 2.9 |
| Example 12 | 2.9 |

TABLE 2-continued

| Negative electrode | First retention (%) |
|---|---|
| Example 13 | 2.8 |
| Example 14 | 5.0 |
| Example 15 | 6.8 |
| Example 16 | 19.0 |
| Example 17 | 5.6 |
| Example 18 | 6.5 |
| Example 19 | 19.2 |
| Example 20 | 4.9 |
| Example 21 | 5.7 |
| Example 22 | 6.7 |
| Example 23 | 10.9 |
| Example 24 | 12.6 |
| Example 25 | 4.4 |
| Example 26 | 7.1 |
| Example 27 | 4.2 |
| Example 28 | 9.6 |
| Example 29 | 15.3 |
| Comparative Example 1 | 1.7 |

FIGS. 2 to 31 show charge-discharge curves corresponding to Examples 1 to 29 and Comparative Example 1. From these, it can be seen that the charge-discharge curves of the negative electrode active materials of Examples 1 to 29 are different from the charge-discharge curve of Comparative Example 1 in which $Li_4Ti_5O_{12}$ is used as the negative electrode active material. There were obtained charge-discharge curves corresponding to the compositions of the respective materials as described above in the embodiment.

As shown in Table 2, the first retentions of the negative electrode active materials of Examples 1 to 29 are greater than the first retention of Comparative Example 1. The value of the first retention of Comparative Example 1 is very small at 1.7%, whereas the first retentions of Examples 1 to 29 are increased to 2.8 to 19.2%. This is believed to be an effect of the added element. It can be seen that the value of the first retention tends to be greater as the amount of the element added is greater.

5. Evaluation of Second Retention

The produced batteries of Examples 30 to 32 were once charged and then discharged in order to measure the second retention of the positive electrode active material. The second retention is the irreversible capacity rate at the second cut-off voltage. The second cut-off voltage refers to the electrode potential in a region of the charge-discharge curve during the last period of a discharge where the remaining capacity hardly changes but the potential changes rapidly. Since the active material to be evaluated is the active material used for the active electrode, charging in this test is a reaction in such a direction that the potential of the positive electrode active material is lowered, i.e., a reaction that increases the voltage as a secondary battery with the counter electrode being Li. Discharging is a reaction in the opposite direction. A charge-discharge system from Nagano Co., Ltd. was used for the charge-discharge test. The charge-discharge was performed so that the voltage range was 3 V to 4.3 V for Example 30, and 3 V to 4.2 V for Example 31 and Example 32, so that it is a range in which the particular material is commonly used during the charge and discharge. That is, the second cut-off voltage of Examples 31 to 33 was 3 V. It was performed so that the current rate was 0.02 C rate. Herein, C rate is defined as a current value representing the discharge rate over 1 hour, and 0.02 C rate is the current value that is 0.02 time 1 C rate, i.e., a current value representing the discharge rate over 50 hours.

Figure 32:
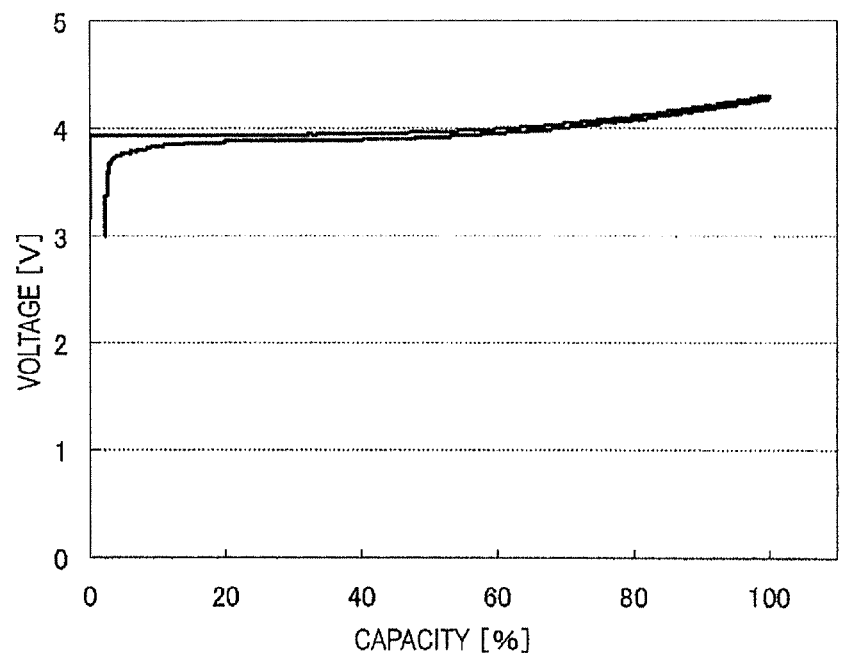
FIG. 32 shows a charge-discharge curve for metal Li of a positive electrode active material of Example 30.
Figure 33:
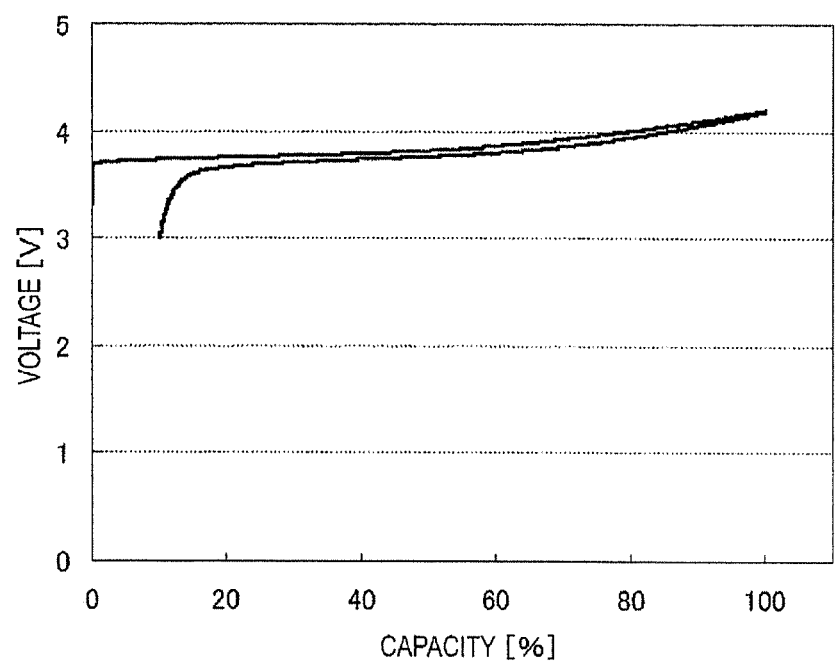
FIG. 33 shows a charge-discharge curve for metal Li of a positive electrode active material of Example 31.
Figure 34:
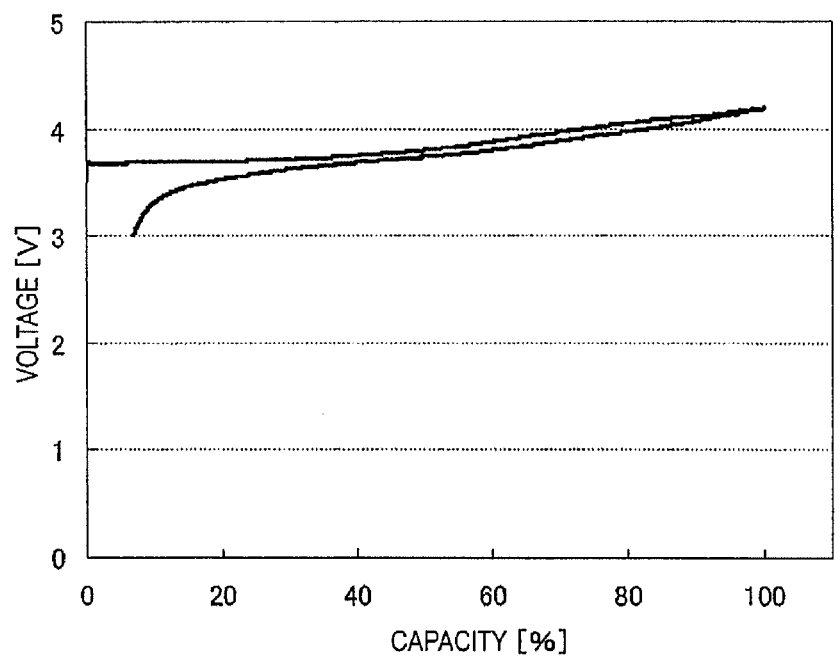
FIG. 34 shows a charge-discharge curve for metal Li of a positive electrode active material of Example 32.

FIGS. 32 to 34 show charge-discharge curves during the initial charge and discharge for the negative electrode active materials, measured as described above. For the sake of simplicity, the horizontal axis represents the capacity proportion with 100% being the capacity when fully charged. The discharge curve is drawn to extend backwards starting from 100%.

The irreversible capacity rate in the initial charge and discharge, i.e., the second retention, is calculated by the following expression.

Second retention (%)=100−discharging capacity (mAh)/charging capacity (mAh)×100

Table 3 shows the second retentions of the positive electrode active materials of Examples 31 to 33 as examined by the method described above.

TABLE 3

| Positive electrode | Second retention (%) |
| --- | --- |
| Example 30 | 2.3 |
| Example 31 | 10.1 |
| Example 32 | 6.9 |

As shown in Table 3, second retention values of 2.3% to 10.1% were obtained for the positive electrode active materials of Examples 30 to 32.

6. Production of Battery (for Cycle Characteristics Evaluation)

Coin-shaped batteries were produced. An electrode produced using the negative electrode active material of Example 8 was used as the negative electrode, and an electrode produced using the positive electrode active material of Example 32 was used as the positive electrode. A separator impregnated with an electrolytic solution and a negative electrode were stacked in this order on the positive electrode, put in a coin-shaped case, and sealed, to obtain a battery. The separator was a three-layer separator including a polyethylene (PE) microporous membrane from Asahi Kasei E-materials Corporation and a polypropylene (PP) non-woven fabric from Tapyrus Co., Ltd., layered together in the order PP/PE/PP. The electrolytic solution included 1 mol/L of $LiPF_6$ dissolved in a solvent containing ethylene carbonate (EC) and ethylmethyl carbonate (EMC) mixed together so that EC/EMC=1/3. The produced battery will be referred to as an example battery for cycle characteristics evaluation.

For comparison, a battery was produced, in which an electrode produced using the negative electrode active material of Comparative Example 1 is used as the negative electrode, and an electrode produced using the positive electrode active material of Example 32 is used as the positive electrode. This will be referred to as a comparative example battery for cycle characteristics evaluation.

7. Evaluation of Cycle Characteristics

The cycle characteristics were evaluated, using the produced example and comparative example batteries for cycle characteristics evaluation. Each battery was subjected to a cycle test after being charged and discharged over 2 cycles or more at a current value of 0.05 C. The voltage range during the charge and discharge was 1 to 3 V. In the cycle test, it was charged through a constant-current charge at a current value of 1 C, followed by a constant-voltage charge until a current value of 0.05 C was reached. The discharge was performed through a constant-current charge at a current value of 1 C. The charge-discharge under the conditions described above was repeated over 200 cycles, and the retention of the discharging capacity of each cycle was calculated with 100% being the capacity of the first discharge of the cycle test.

Figure 35:
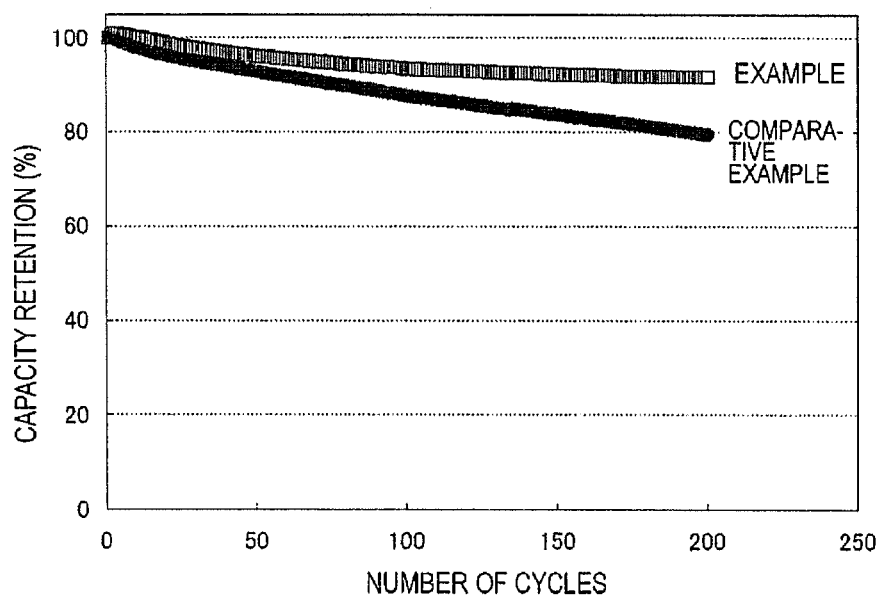
FIG. 35 shows cycle characteristics of batteries of examples and those of batteries of comparative examples.

FIG. 35 shows the results of capacity retention. As can be seen from FIG. 35, the example battery for cycle characteristics evaluation retained 90% or more of the capacity even after 200 cycles, indicating a capacity retention higher, by 10% or more, than the comparative example battery for cycle characteristics evaluation.

8. Discussion

Figure 36:
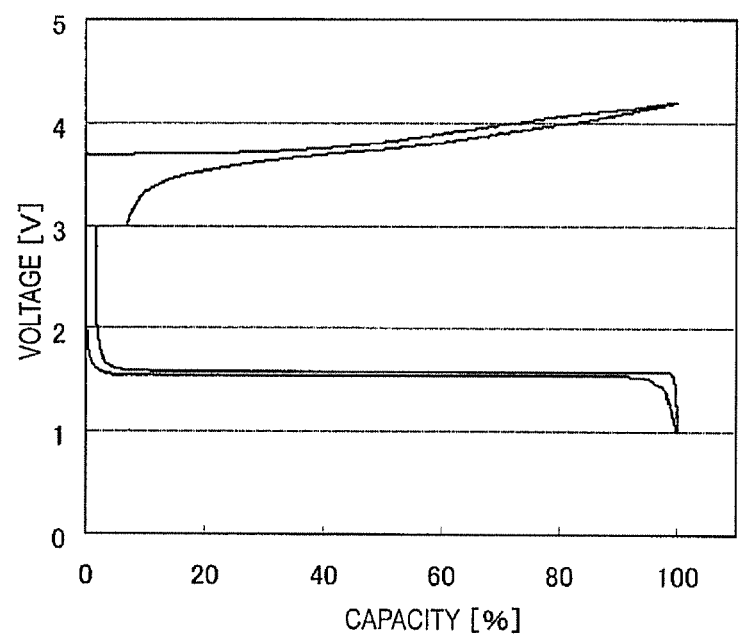
FIG. 36 shows a charge-discharge curve for the positive electrode and the negative electrode of a nonaqueous electrolyte secondary battery using the negative electrode of Comparative Example 1 (and the positive electrode of Example 32).

Based on the results of Table 2 and Table 3, the first retention of the negative electrode active material of Comparative Example 1 is smaller than the second retentions of the positive electrode active materials of Examples 30 to 31. Therefore, it can be seen that when a battery is produced using the material of Comparative Example 1 as the negative electrode active material, it will be a battery of the positive electrode limitation type, with any of the materials of Examples 31 to 33 used as the positive electrode active material. For example, where a nonaqueous electrolyte secondary battery is produced using the negative electrode active material of Comparative Example 1 and the positive electrode active material of Example 32, there is obtained a battery having such a charge-discharge curve as shown in FIG. 36. As can be seen from FIG. 36, during a discharge, the voltage of the positive electrode decreases before the voltage of the negative electrode increases, whereby the discharge of the secondary battery ends by the positive electrode limitation. Thus, it is a secondary battery of the positive electrode limitation type. Therefore, it is believed that since the positive electrode active material is discharged deeply, the crystalline structure of the positive electrode active material alters over repetitions of charging and discharging, whereby the cycle characteristics are likely to lower.

In contrast, the first retentions of the negative electrode active materials of Examples 1 to 29 are greater than the second retention of Example 30. Therefore, where a battery is produced using one of the materials of Examples 1 to 29 as the negative electrode active material and using the material of Example 30 as the positive electrode active material, it is possible to produce a battery of the negative electrode limitation type. As described above, FIG. 1C shows a charge-discharge curve in a case where a nonaqueous electrolyte secondary battery is produced using the negative electrode active material of Example 4 and the positive electrode active material of Example 32. As can be seen from FIG. 1C, the irreversible capacity rate Qa of the negative electrode is greater than the irreversible capacity rate Qc of the positive electrode. In other words, the first retention at the first cut-off voltage is greater than the second retention at the second cut-off voltage. Therefore, during a discharge of a nonaqueous electrolyte secondary battery, before the voltage of the positive electrode decreases, the release of lithium ion at the negative electrode is saturated, thereby increasing the voltage of the negative electrode, thus ending the discharge of the secondary battery by the negative electrode limitation. That is, it is a secondary battery of the negative electrode limitation type. Therefore, deep discharging of the positive electrode active material is suppressed, thereby suppressing the alteration of the crystalline structure of the positive electrode active material over repetitions of charging and discharging. It is believed that this is the reason why the nonaqueous electrolyte secondary batteries of the examples exhibit excellent cycle characteristics.

As described above, FIG. 35 shows that the cycle characteristics of example batteries for cycle characteristics evaluation are improved as compared with the comparative example. The reason is believed to be as follows. With the battery for cycle characteristics evaluation of this example, the discharge ends by the negative electrode limitation, thereby suppressing deep discharging of the positive electrode active material, thereby suppressing the alteration of the crystalline structure of the positive electrode active material and the lowering of the capacity of the positive electrode, thus maintaining a high discharging capacity.

While the second retentions of the positive electrode active materials of Example 31 and Example 32 are as large as 10.1% and 6.9%, it is possible to produce a battery of the negative electrode limitation type by combining them with a negative electrode active material having an even larger first retention. That is, where a battery is produced using one of the materials of Examples 2 to 4, 8, 16, 19, 23, 24, 26, 28 and 29 as the negative electrode active material and using the material of the Example 31 as the positive electrode active material, it is possible to produce a battery of the negative electrode limitation type. Where a battery is produced using the material of Example 4, 16, 19, 23, 24 or 29 as the negative electrode active material and using the material of Example 32 as the positive electrode active material, it is possible to produce a battery of the negative electrode limitation type.

With the negative electrodes of Examples 1 to 29 described above, if a second plateau is observed on the charge-discharge curve, the potential of the negative electrode at the end of the discharge of the nonaqueous electrolyte secondary battery including such a negative electrode is preferably set to a voltage value of the second plateau during the initial charge of the negative electrode. For example, as can be seen from the charge-discharge curves shown in FIG. 3 (Example 2) and FIG. 4 (Example 3), when a discharge proceeds past the potential of the second plateau, the potential of the negative electrode increases rapidly. Therefore, by setting the potential of the negative electrode at end of the discharge to a voltage value of the second plateau, it is possible to reliably realize the negative electrode limitation, i.e., as the potential of the negative electrode increases rapidly, the battery voltage of the nonaqueous electrolyte secondary battery reaches the discharge end voltage, thus ending the discharge.

While this example illustrates an example where the first cut-off voltage and the second cut-off voltage are equal to each other, they may be different from each other.

As shown in the examples above, the irreversible capacity rate of the negative electrode can be set to be greater than the irreversible capacity rate of the positive electrode, and by realizing the negative electrode limitation, it is possible to suppress deterioration of the positive electrode active material and realize a nonaqueous electrolyte secondary battery with excellent cycle characteristics.

Nonaqueous electrolyte secondary batteries disclosed in the present application work on negative electrode limitation during a discharge, and therefore have excellent cycle characteristics and are suitable as nonaqueous electrolyte secondary batteries for mobile applications. They can also be used for applications such as large batteries, electric vehicles, etc.

A person of ordinary skill in the art will understand that various changes and/or modifications can be made to the illustrative embodiment of the prevent invention as illustrated by specific embodiments, without departing from the sprit and scope of the invention broadly defined herein.

Thus, the present embodiment is in any respect illustrative of the present invention and not limiting thereof. Other features and aspects of the present invention will be appreciated by a person of ordinary skill in the art upon reading and understanding the disclosure herein. It is clear that expected changes and modifications to such features, aspects, and reported results and examples are included within the scope of the present invention, which is only defined by the appended claims.

What is claimed:

1. A nonaqueous electrolyte secondary battery comprising:
a positive electrode capable of absorbing and releasing lithium, containing a positive electrode active material composed of a lithium-containing transition metal oxide having a layered crystalline structure; and
a negative electrode capable of absorbing and releasing lithium, containing a negative electrode active material composed of a lithium-containing transition metal oxide obtained by substituting some of Ti element of a lithium-containing titanium oxide having a spinel crystalline structure with one or more element different from Ti, the one or more element different from Ti including at least B,
wherein a discharge ends by negative electrode limitation.

2. The nonaqueous electrolyte secondary battery according to claim 1, wherein the negative electrode active material has an irreversible capacity rate greater than the positive electrode active material.

3. The nonaqueous electrolyte secondary battery according to claim 1, wherein the lithium-containing titanium oxide is $Li_4Ti_5O_{12}$.

4. The nonaqueous electrolyte secondary battery according to claim 1, wherein the lithium-containing transition metal oxide obtained by substituting some of Ti element of a lithium-containing titanium oxide having a spinel crystalline structure with one or more element different from Ti includes a compound represented as $Li_4Ti_{5-z}B_zO_{12}$ ($0<z\leq0.3$).

5. The nonaqueous electrolyte secondary battery according to claim 1, wherein the lithium-containing transition metal oxide obtained by substituting some of Ti element of a lithium-containing titanium oxide having a spinel crystalline structure with one or more element different from Ti includes a compound represented as $Li_4Ti_{5-w-z}Mn_wB_zO_{12}$ ($0<w\leq0.3$, $0<z\leq0.3$).

6. The nonaqueous electrolyte secondary battery according to claim 1, wherein the lithium-containing transition metal oxide obtained by substituting some of Ti element of a lithium-containing titanium oxide having a spinel crystalline structure with one or more element different from Ti includes a compound represented as $Li_4Ti_{5-x-z}Fe_xB_zO_{12}$ ($0<x\leq0.3$, $0<z\leq0.3$).

7. The nonaqueous electrolyte secondary battery according to claim 1, wherein the positive electrode active material includes at least one compound represented as $Li_aNi_{1-b-c}Co_bM_cO_2$ ($0.95\leq a\leq1.12$, $0\leq b\leq1$, $0\leq c\leq0.50$, $0\leq b+c\leq1$, M is at least one element selected from the group consisting of Al, Mn, Ti, Mg, Mo, Y, Zr and Ca).

8. The nonaqueous electrolyte secondary battery according to claim 1, wherein the positive electrode active material includes at least one selected from the group consisting of:
a compound represented as $LiCoO_2$;
a compound represented as $LiNi_{1/3}Mn_{1/3}Co_{1/3}O_2$; and
a compound represented as $LiNi_{0.81}Co_{0.15}Al_{0.04}O_2$.

* * * * *